US007676628B1

(12) United States Patent  (10) Patent No.: US 7,676,628 B1
Compton et al.  (45) Date of Patent: Mar. 9, 2010

(54) METHODS, SYSTEMS, AND COMPUTER PROGRAM PRODUCTS FOR PROVIDING ACCESS TO SHARED STORAGE BY COMPUTING GRIDS AND CLUSTERS WITH LARGE NUMBERS OF NODES

(75) Inventors: James T. Compton, Durham, NC (US); Uday K. Gupta, Westford, MA (US); Sorin Faibish, Newton, MA (US); Roy E. Clark, Hopkinton, MA (US); Stephen Fridella, Belmont, MA (US); Xiaoye Jiang, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 634 days.

(21) Appl. No.: 11/394,768

(22) Filed: Mar. 31, 2006

(51) Int. Cl.
*G06F 12/00* (2006.01)
*G06F 13/00* (2006.01)

(52) U.S. Cl. .................. 711/114; 711/148; 711/202

(58) Field of Classification Search ................. 711/114, 711/147–148, 154, 202–203
See application file for complete search history.

(56) References Cited

U.S. PATENT DOCUMENTS

| 4,654,654 | A | * | 3/1987 | Butler et al. ................. 370/463 |
| 5,490,270 | A | | 2/1996 | Devarakonda et al. |
| 5,848,434 | A | * | 12/1998 | Young et al. ................. 711/144 |
| 6,044,367 | A | * | 3/2000 | Wolff ............................ 707/2 |
| 6,339,793 | B1 | | 1/2002 | Bostian et al. |
| 6,578,121 | B1 | | 6/2003 | Schutzman |
| 6,694,368 | B1 | | 2/2004 | An et al. |
| 6,760,823 | B1 | | 7/2004 | Schutzman |
| 6,934,725 | B1 | | 8/2005 | Dings |
| 7,185,070 | B2 | | 2/2007 | Paul et al. |
| 2002/0049778 | A1 | * | 4/2002 | Bell et al. .................... 707/200 |
| 2003/0018606 | A1 | | 1/2003 | Eshel et al. |
| 2003/0188097 | A1 | * | 10/2003 | Holland et al. .............. 711/114 |
| 2004/0268064 | A1 | * | 12/2004 | Rudelic ....................... 711/156 |
| 2006/0036602 | A1 | * | 2/2006 | Unangst et al. ................ 707/9 |
| 2006/0126639 | A1 | | 6/2006 | Bozak et al. |
| 2006/0206662 | A1 | * | 9/2006 | Ludwig et al. .............. 711/114 |

OTHER PUBLICATIONS

Non-Final Official Action for U.S. Appl. No. 11/479,939 (Jun. 24, 2009).

* cited by examiner

*Primary Examiner*—Sheng-Jen Tsai
*Assistant Examiner*—Michael C Krofcheck
(74) *Attorney, Agent, or Firm*—Jenkins, Wilson, Taylor & Hunt, P.A.

(57) ABSTRACT

Methods, systems, and computer program products for providing access to shared storage by a plurality of nodes are disclosed. According to one method, at a node of a plurality of nodes sharing access to a disk array, an application input/output (I/O) operation and whether sufficient space in the disk array has been mapped at the node for the I/O operation are detected. In response to detecting that sufficient space in the disk array has not been mapped at the node for the I/O operation, a map for the I/O operation including physical disk access information is requested and obtained from a server. The physical disk access information included within the map for the application I/O operation obtained from the server is used to perform the I/O operation by accessing the disk array without intervention by the server.

31 Claims, 17 Drawing Sheets

METHODS, SYSTEMS, AND COMPUTER PROGRAM PRODUCTS FOR PROVIDING ACCESS TO SHARED STORAGE BY COMPUTING GRIDS AND CLUSTERS WITH LARGE NUMBERS OF NODES

TECHNICAL FIELD

The subject matter described herein relates to providing access to shared storage in a multiple computer environment. More particularly, the subject matter described herein relates to methods, systems, and computer program products for providing access to shared storage by computing grids and clusters with large numbers of nodes.

BACKGROUND

Sharing of access to physical disk storage and virtualization of input/output (I/O) address space is commonly addressed by distributed logical volume managers which provide a logical view of the physical disk address space that is shared. Such volume managers require a means of maintaining a common definition of the logical-to-physical address mapping. This maintenance of a common definition typically requires some form of distributed locking and metadata communication among the cooperating nodes. Such locking and metadata communication has proven difficult to provide in a high performance manner for environments with large node counts and heterogeneous shared storage.

Data management services, such as creation of point-in-time copies, data migration, and data replication on shared access volumes, represent another area of concern in shared access environments. Providing these data management services becomes increasingly difficult to implement and maintain in a shared access environment using distributed logical volumes.

Another approach to maintenance of a common definition of a logical-to-physical address mapping has been the use of inline virtualizing appliances. While inline virtualizing appliances do not require communication among the client nodes that are sharing access to the shared storage to provide a shared definition of the logical storage address space, they introduce an additional processing hop between the client nodes and the physical storage subsystems. This hop produces extra I/O latency and does not scale well for large numbers of nodes sharing access through the appliance to the same shared storage. Because these inline virtualizing appliances are directly in the I/O path, they must communicate between themselves to maintain a consistent I/O addressing translation across a set of appliances. Accordingly, these appliances do not scale well to very large node counts because of the communication overhead required to maintain the consistent I/O addressing translation. When such appliances implement data mobility functions, they typically require an external agency to coordinate I/O actions, introducing an additional communication latency for I/O operations which require mobility services. This latter scaling and performance issue is not resolved by appliances which use hardware-based acceleration (HBA) devices to alleviate the dual hop I/O latency problems.

Inline appliances also restrict I/O to those storage devices which have been qualified for the appliances I/O drivers and HBA hardware. The burden of qualifying such hardware and software for the broad range of available storage devices is costly and time consuming.

Accordingly, in light of these difficulties associated with conventional access to shared storage there exists a need for improved methods, systems, and computer program products for providing access to shared storage by computing grids and clusters with large numbers of nodes.

SUMMARY

According to one aspect, the subject matter described herein comprises methods, systems, and computer program products for providing access to shared storage by a plurality of nodes. One method includes, at a node of a plurality of nodes sharing access to a disk array, detecting a first application input/output (I/O) operation and detecting whether sufficient space in the disk array has been mapped at the node for the first application I/O operation. In response to detecting that sufficient space in the disk array has not been mapped at the node for the first application I/O operation, requesting and obtaining a map including physical disk access information for the first application I/O operation from a server, and using the physical disk access information included within the map for the application I/O operation obtained from the server to perform the first application I/O operation by accessing the disk array without intervention by the server.

The subject matter described herein for providing access to shared storage by computing grids and clusters with large numbers of nodes may be implemented using a computer program product comprising computer executable instructions embodied in a computer-readable medium. Exemplary computer-readable media suitable for implementing the subject matter described herein include chip memory devices, disk memory devices, programmable logic devices, and application specific integrated circuits. In addition, a computer-readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
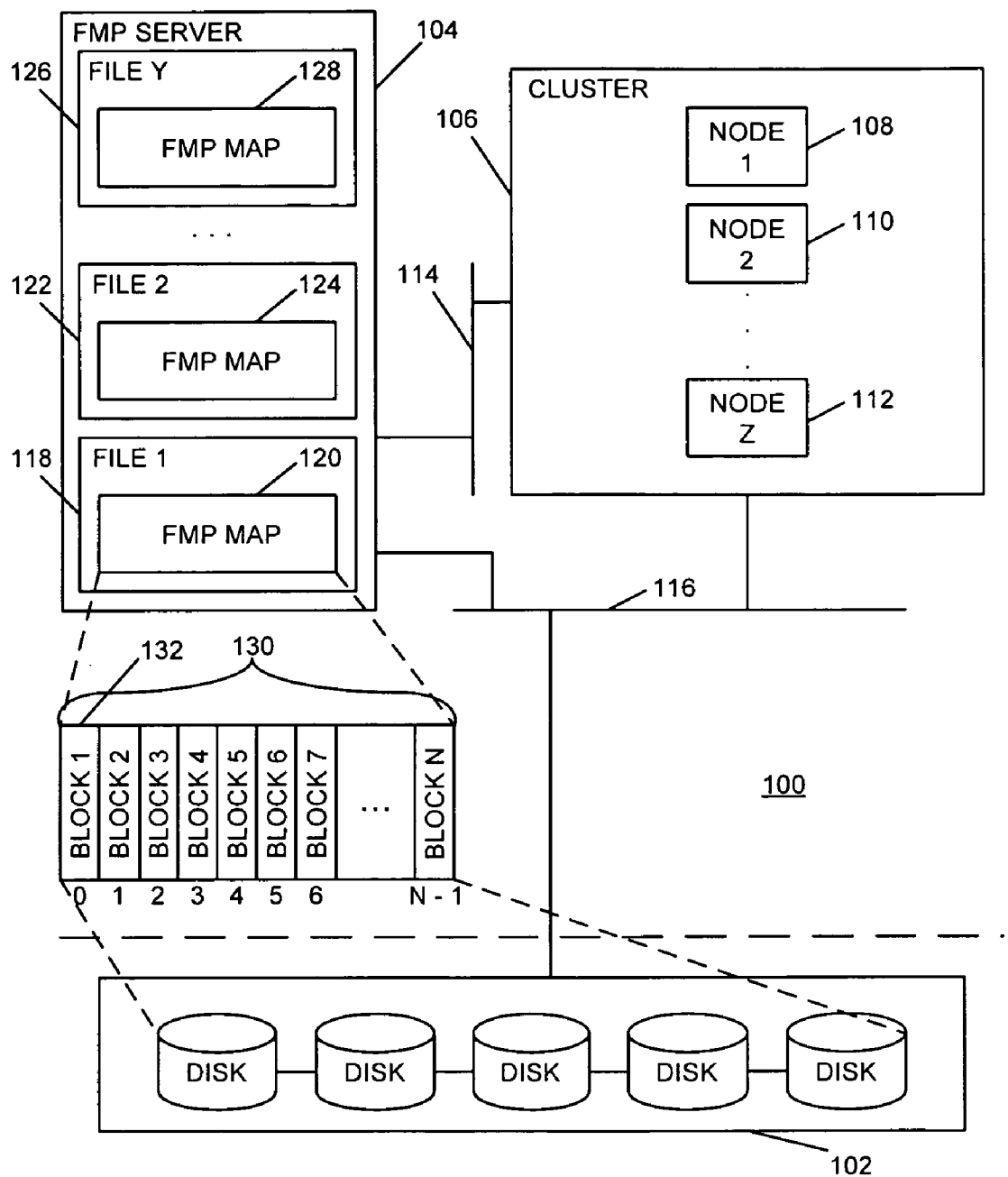
FIG. 1 is a block diagram of an exemplary cluster computing system for providing decentralized disk access for the cluster processing environment according to an embodiment of the subject matter described herein.

The methods, systems, and computer program products described herein provide a network block access whereby physical storage may be accessed directly from a computing node with a centralized block manager providing management of disk space allocations. The centralized block manager may define logical to physical address translations and may maintain a coherent view of shared storage among computing nodes. Accordingly, the requirement within conventional systems of communicating locking information among clustered nodes to coordinate logical-to-physical address translations may be eliminated and associated software complexity may be reduced.

By providing a single management point with integration of file server functions and block level functions in a single storage services device, both block and file storage may share a single model for provisioning, configuration, and data mobility. Data management services, such as point-in-time copies, data migration, and data replication, may also be improved by centralizing the services at a single location. These data management services may be performed by the centralized block manager and may also be performed transparently to and without intervention of the client nodes.

Further, by providing client nodes with logical-to-physical address translations, and thereby allowing the nodes to access the physical disks directly, the extra processing hop associated with inline virtualizing appliances may be eliminated. Further, the communication of virtualization metadata may also be reduced.

Raw logical units (LUNs) are made up of collections of storage blocks of a RAID array and are exported from the RAID array for use at the application level. A file system is a logical data structure that can be used to track free and allocated regions of space across a range of raw LUNs. Files in the file system are logical collections of space taken from the pool of space maintained by the file system. The central block manager uses files to represent virtual LUNs which are accessed by multiple computing nodes in a cluster environment. The central block manager provides file organization maps of each virtual LUN to the multiple computing nodes in a cluster in order to allow the multiple computing nodes to directly access the data contained in the virtual LUNs from the raw logical units from which they are built. As will be described in more detail below, file organization structures or maps may include logical references to virtual address ranges within a file and may include physical references to raw storage devices/blocks. A virtual LUN may be constructed within a file whereby these physical references may be used to access the physical raw LUN storage devices directly from a client node.

A central block manager may provide virtual LUN allocation tracking for nodes within a cluster and provide virtual LUN data access maps to those nodes. In contrast to a conventional network file interface, a network block interface will be described herein for a decentralized client-based direct disk access. Protocol independence for the clients may be achieved and dynamic allocation and remapping of data storage blocks may be performed.

File versioning for a file containing a virtual LUN may be performed at a server, such as a central block manager, and the server may track which client nodes have mappings to a file. When a snapshot of a file is taken, and the virtual LUN within the file is subsequently written to, the server may inform clients with mappings to the file to change block access designators for newly allocated changed blocks. In this way, a server may act as a single repository for disk access metadata.

FIG. 1 illustrates an exemplary cluster computing system 100 for providing decentralized direct disk access for cluster nodes. Within system 100, a RAID array 102 provides physical storage disks. A fragment mapping protocol (FMP) server 104 provides a centralized tracking service for tracking allocations of storage blocks for files including blocks from within the disks of RAID array 102. A cluster 106 of computing nodes provides shared access to a common pool of storage within system 100. A node 1 108, a node 2 110, up to a node Z 112 form the cluster 106.

FMP server 104 and cluster 106 may be interconnected via an Internet protocol (IP) network 114. IP network 114 may allow nodes within cluster 106 to request file mappings of FMP server 104 and may allow FMP server 104 to return file maps including logical and physical disk information to nodes within cluster 106.

A storage area network (SAN) 116 may provide an interface between RAID array 102 and both of FMP server 104 and cluster 106. SAN 116 may be an FC SAN, an IP SAN, or may implement IP over a fiber channel physical interface without departing from the scope of the subject matter described herein. Accordingly, FMP server 104 and nodes within cluster 106 may use an FC SAN or an IP SAN, or a combination FP/IP SAN to interface with RAID array 102. For ease of illustration, SAN 116 is represented by a single interconnection in FIG. 1.

FMP server 104 may use SAN 116 to access physical disks for storage of allocation tracking metadata, including FMP file maps and allocation information. Cluster 106 may use SAN 116 and the FMP file maps and allocation information provided by FMP server 104 to perform direct disk accesses within RAID array 102.

Alternatively, FMP server 104 and cluster 106 may use any other protocol in place of IP network 114 to enable communication between them. Further, FMP server 104 and cluster 106 may use any other protocol in place of SAN 116 by which a server or client nodes within a cluster may share access to storage. Protocol within this context may include peer-to-peer communication stacks as well as physical connection media. Accordingly, all such protocols are within the scope of the subject matter described herein.

Additionally, any disk arrangement may be used in place of RAID array 102 as shared storage. For example, an arrangement known as just a bunch of disks/drives (JBOD) or a single disk may be used as shared storage without departure from the scope of the subject matter described herein.

Within FMP server 104, files may be used to represent virtual LUNs within system 100. Files within FMP server 104 may be mapped to nodes within cluster 106 and multiple nodes may access a file within FMP server 104.

Within FMP server 104, a file 1 118 includes an FMP map 120, a file 2 122 includes an FMP map 124, up to a file Y 126 which includes an FMP map 128 are depicted. As described above and in more detail below, each file within FMP server 104 may represent a virtual LUN within system 100 and maps to physical storage space within RAID array 102.

A data storage pool 130 represents a logically contiguous view of a portion of physical RAID array 102, and as such, provides a mapping of storage extents 132 onto RAID array 102. For simplification, data storage pool 130 is illustrated as a logical layer that resides adjacent to RAID array 102, which may include physical disks. However, it is understood that one or more logical layers, such as aggregations of RAID arrays, aggregations of pools 130, and aggregations of RAID groups, may reside between data storage pool 130 and the physical disks that make up RAID array 102 without departing from the scope of the subject matter described herein.

As blocks are allocated from data storage pool 130, they may be tracked within an FMP map, such as FMP map 120 within file 1 118. Within system 100, blocks 132 may be allocated individually or as contiguous groupings. An allocation of a block or a contiguous group of blocks will be referred to as an allocation of a "storage extent" herein. Accordingly, an allocated storage extent may include one or more physical blocks within RAID array 102.

Figure 2:
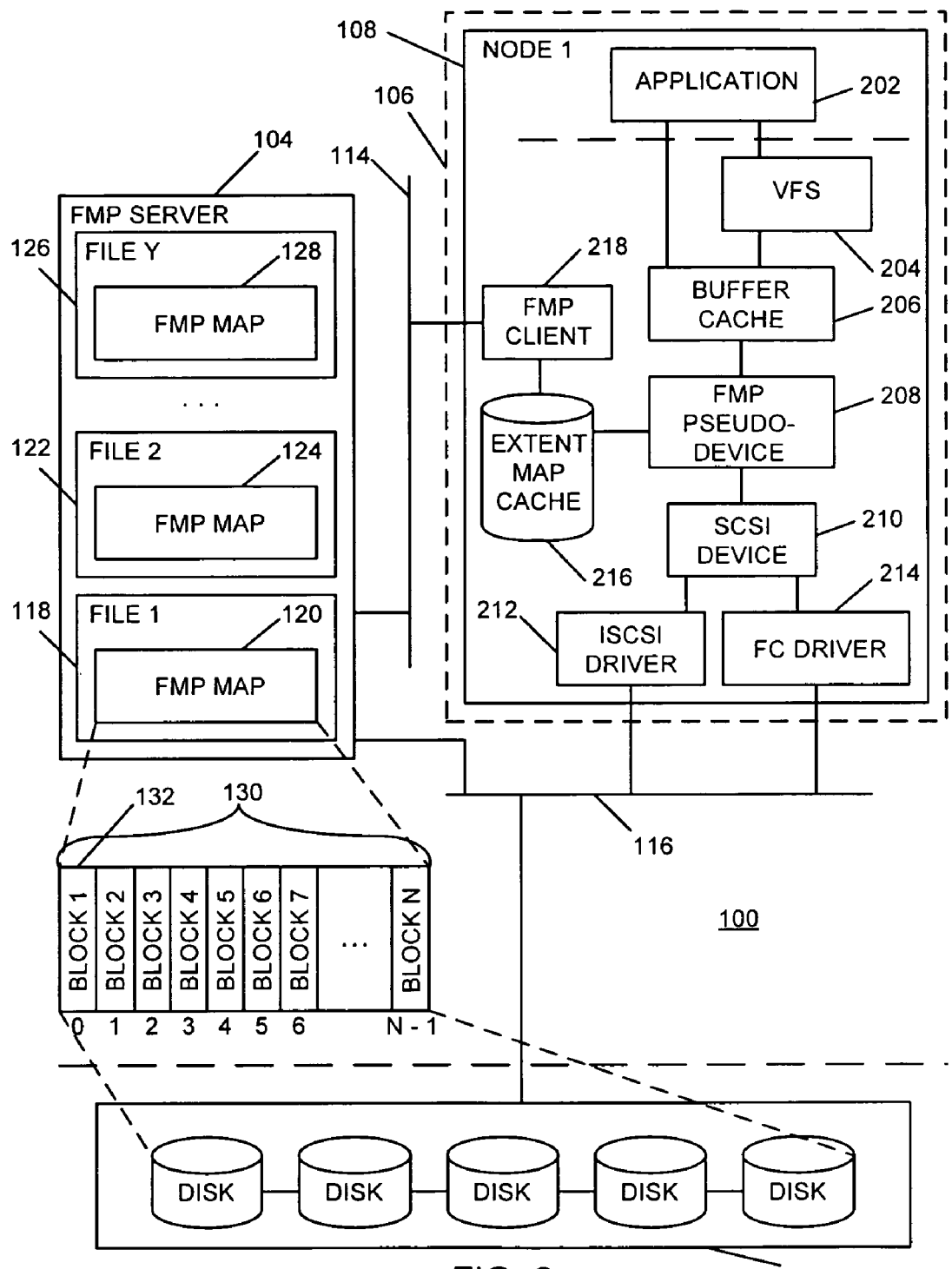
FIG. 2 is a block diagram of the exemplary cluster computing system for providing decentralized disk access for the cluster processing environment with a magnified view of a node within the cluster of nodes according to an embodiment of the subject matter described herein.

FIG. 2 illustrates exemplary cluster computing system 100 with a magnified view of node 1 108. Within node 1 108, an application 202 may perform application level functions within node 1 108. Application 202 may interface with a virtual file system (VFS) 204 for virtual storage mappings. VFS 204 may interface with a buffer cache 206 to directly interact with a logical storage volume. Application 202 may also directly interface with buffer cache 206 to bypass VFS 204.

An FMP pseudo-device 208 is a disk interface device that may provide a file mapping interface to buffer cache 206 and that may be used by either of VFS 204 and application 202. FMP pseudo-device 208 may interface with raw storage blocks within RAID array 102 by obtaining physical block addresses for an I/O operation and providing the physical block addresses to lower-level drivers to perform disk accesses directly without intervention of a server. FMP pseudo-device 208 may interface with the raw storage blocks via a small computer system interface (SCSI) device 210 to directly access physical storage for read and write operations. SCSI device 210 may interface with an Internet small computer systems interface (ISCSI) driver 212 and a fiber channel (FC) driver 214. ISCSI driver 212 and FC driver 214 may perform low level disk access functions for node 1 108 and may communicate over SAN 116 to perform direct disk operations on raw storage blocks within disks of RAID array 102.

It is understood that many other disk interface protocols may be used to implement the communications described herein. For example, small computer systems interface (SCSI), fiber channel protocol (FCP) and any other protocol available to client platforms including remote direct memory access (RDMA), Infiniband, and others or combinations of the above may be used. Accordingly, all are considered within the scope of the subject matter described herein.

FMP pseudo-device 208 also interfaces with an extent map cache 216 to access FMP maps to retrieve disk identifiers for storage extents of raw storage blocks within disks of RAID array 102. As will be described in more detail below, extent map cache 216 may store read mappings, write mappings, and read/write mappings of virtual LUN addresses to direct raw LUN addresses to allow direct raw LUN access by node 1 108 to physical blocks within disks of RAID array 102.

An FMP client 218 may communicate with FMP server 104 over IP network 114. FMP client 218 may request file mappings for any files logically represented within FMP server 104 that are accessible by node 1 108. For example, node 1 108 may have access to file 1 118 and file 2 122, each of which may represent a virtual LUN. In such a case, to facilitate I/O to the virtual LUNs from node 1 108, FMP client 218 may request read and write mappings for each of file 1 118 and file 2 122. As described above, FMP server 104 may maintain FMP map 120 for file 1 118 and may maintain FMP map 124 for file 2 122. As will be described in more detail below, the FMP maps associated with the files on FMP server 104 may include identifiers to indicate the allocation status of virtual regions represented by the FMP maps.

In response to a request from FMP client 218 for a read or write mapping for a region of the virtual address space represented within a file, FMP server 104 may return information including physical disk identifiers for allocated regions of the associated FMP map within RAID array 102 and may return logical identifiers for unallocated regions. As will be described in more detail below, storage extents within a virtual FMP map may be allocated in response to write requests and may have a state associated with them that may vary depending on the current status of the virtual region within the FMP map.

Figure 3:
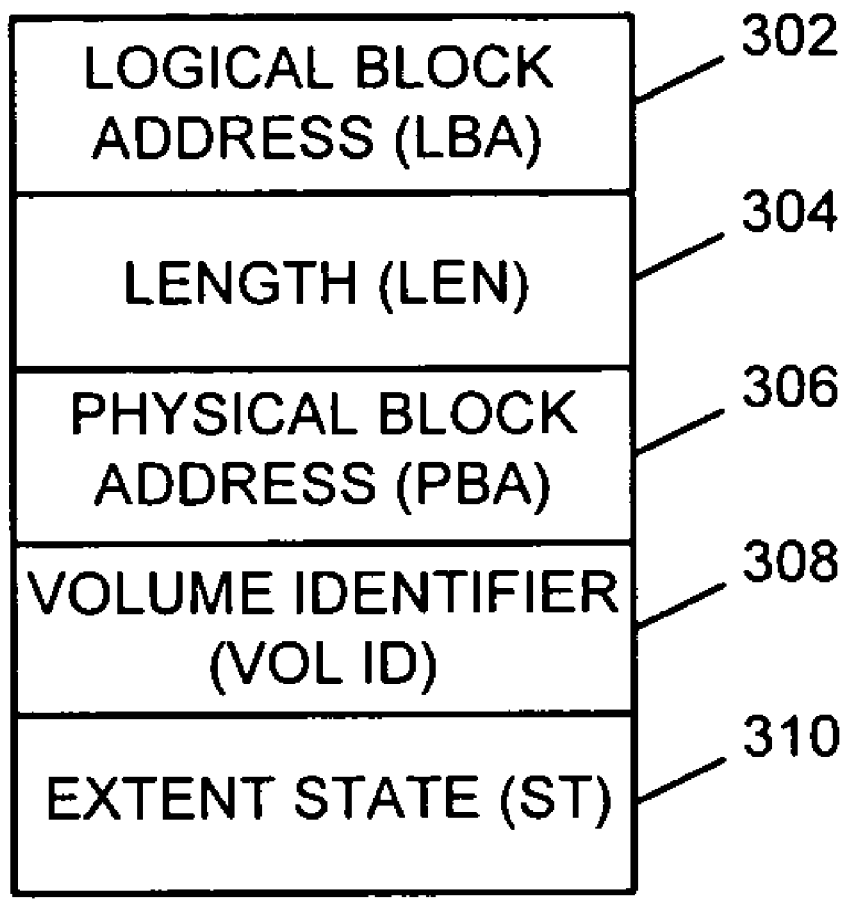
FIG. 3 illustrates an exemplary storage extent identifier for identifying logical and physical characteristics that are associated with a storage extent according to an embodiment of the subject matter described herein.

FIG. 3 illustrates an exemplary storage extent identifier data structure 300 for identifying logical and physical characteristics that are associated with a storage extent within system 100. Storage extent identifier data structure 300 may be used within cluster computing system 100 to identify a disk mapping within RAID array 102 for a storage extent and may associate that disk mapping with the logical address mapping for the storage extent. One or more storage extent identifier data structures 300 may be associated to form a logical map, such as an FMP map, for a file. Within storage extent identifier data structure 300 a logical block address (LBA) 302 may be used to identify a logical location within a file, such as file 1 118, for a storage extent represented by storage extent identifier data structure 300. A length (LEN) 304 may represent the number of logical file blocks of disk storage that are represented by the storage extent associated with storage extent identifier data structure 300. A physical block address (PBA) 306 may represent a physical address within a disk of RAID array 102 for the first physical block of the storage extent represented by storage extent identifier data structure 300. A volume identifier (VOL ID) 308 may be used to identify the physical volume label for the disk within RAID array 102. An extent state (ST) 310 may, be used to indicate the current state of a storage extent represented by storage extent identifier data structure 300. Three states are defined for storage extents. The states are "valid," "invalid," and "none."

A storage extent may be considered valid when space for the storage extent has been allocated within each of a logical FMP map, such as FMP map 120, a logical data storage pool, such as data storage pool 130, and a physical RAID array of physical disks, such as RAID array 102. A commit operation may be used to set a state of valid for a storage extent.

A storage extent may be considered to have an invalid state when physical space has been provisionally allocated within RAID array 102 by FMP server 104 before either valid data has been stored to the storage extent or a commit operation has been performed. For example, when a cluster node, such as node 1 108, requests a writable map from FMP server 104, a storage extent of sufficient size to accommodate the request may be allocated within RAID array 102 as represented within data storage pool 130 and may be identified within an FMP map, such as FMP map 120, with a storage extent identifier data structure 300. Because storage extents are allocated within system 100 in response to write requests from nodes within cluster 106 without further intervention on the part of FMP server 104 to write data to the physical storage devices, an "invalid" state may appear in a "writeable" map. As described above, a storage extent may be considered invalid prior to a commit operation. However, given that physical disk space has been allocated for an invalid storage extent in response to a write request and prior to a commit operation, data may be safely written to the location by a node within cluster 106. In order for data within the storage extent to be considered valid, the node within cluster 106 may perform a "commit" operation to update metadata within the associated FMP map for a logical storage region. For invalid storage extents, a separate read mapping may be obtained, as will be described in more detail below.

The third possible state for a storage extent is "none." A state of none indicates that the associated logical storage region has not been allocated within RAID array 102. Accordingly, the logical region may be considered "sparse" for purposes of this description. Without physical storage, write operations to logical regions associated with storage extents in the "none" state may be disallowed. Accordingly, write maps do not need to contain mappings to regions that are unallocated. Only read maps may usefully employ regions with a state of none. Accordingly, read operations for these regions may return zero-filled buffers without allocation of a storage extent for the logical region. This sparse provisioning of logical storage extents within system 100 may provide an efficient means for storage utilization and may allow compact representations of logical address spaces within files. As described above, read requests to unallocated regions within a logical FMP map, such as FMP map 120, may return zero-filled buffers. Accordingly, a storage extent state of "none" may appear in "readable" maps.

As will be described in more detail below, FMP server 104 may return storage extent mappings to FMP client 218 in the form of "readable" and "writeable" mappings. The FMP client may store these mappings separately within extent map cache 216, and may also combine them within extent map cache 216, as will be described in more detail below, to form a read/write mapping. Accordingly, FMP server 104 may provide read and write mappings and FMP client 218 may manage mappings provided by FMP server 104 to form read/write regions of the logical address spaces represented by storage extents returned within readable and writeable mappings from FMP server 104. Entries within a read/write map may be created after a commit operation has been successfully completed. Because writeable regions that have been committed may be considered valid, read/write maps managed within extent map cache 216 by FMP client 218 may be considered to have a state of "valid" for any storage extents represented.

Figure 4:
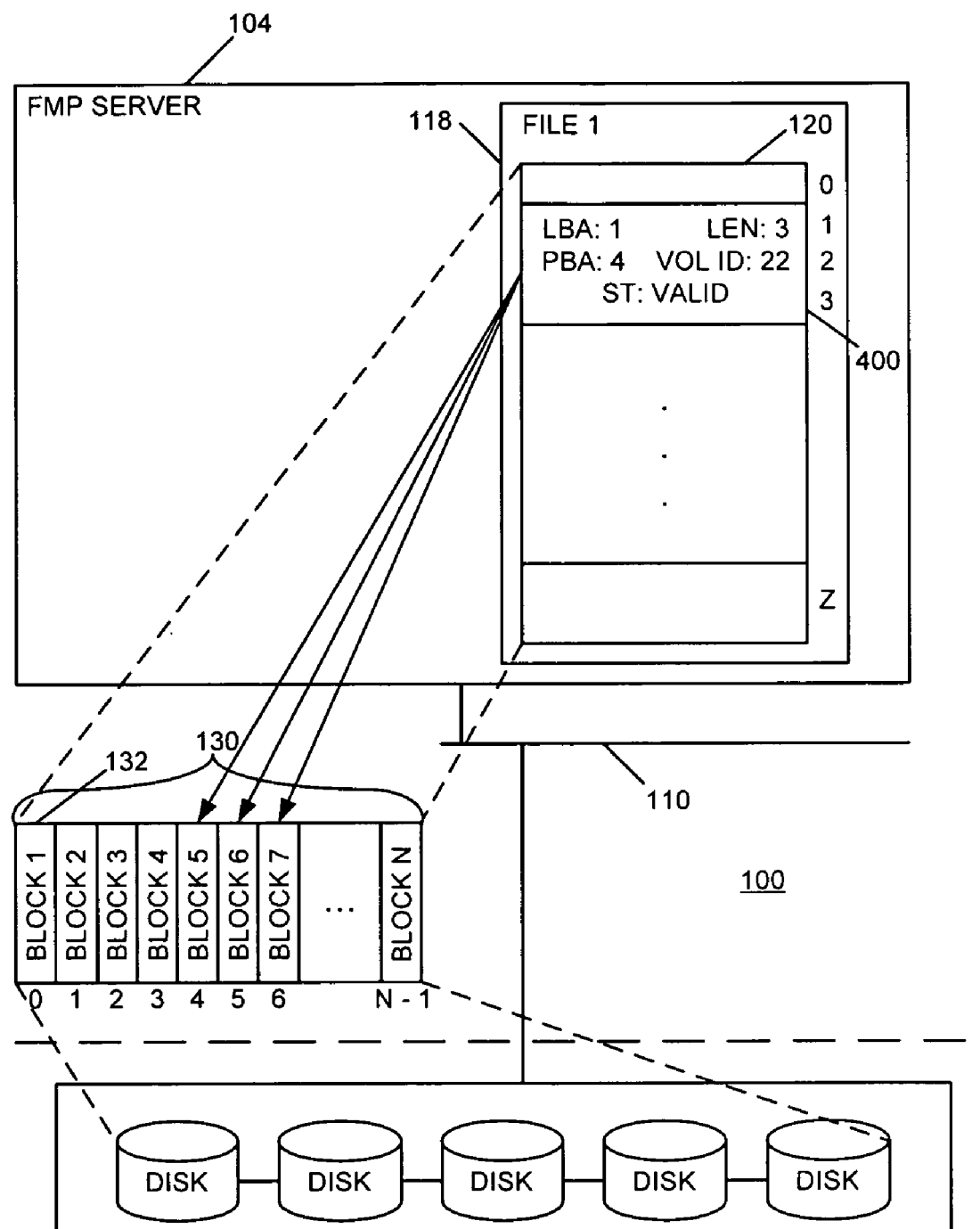
FIG. 4 illustrates a portion of cluster computing system to illustrate use of storage extent identifier within a fragment mapping protocol (FMP) map to identify physical storage locations logically represented within a logical file (virtual logical unit) and physically located within a RAID array according to an embodiment of the subject matter described herein.

FIG. 4 illustrates a portion of cluster computing system 100 and use of storage extent identifier data structure 300 within FMP map 120 to identify physical storage locations logically represented within a logical file containing a virtual LUN and physically located within RAID array 102. Within FIG. 4, file 1 118 and FMP map 120 are shown rotated clockwise by 90 degrees from their positions in FIG. 2 for ease of illustration and representation of a storage extent identifier 400 that maps to physical storage space within RAID array 102. FMP map 120 is indexed from 0 to Z to represent logical block locations within FMP map 120. Storage extent identifier 400 is shown within FIG. 4 to be associated with a logical block address of 1, a length of 3, a physical block address of 4, a volume identifier (ID) of 22, and a state of valid. Storage extent identifier 400 may have the same structure as storage extent identifier data structure 300 illustrated in FIG. 3. Storage extent identifier 400 begins at index 1 within FMP map 120 to indicate that it maps to that logical location within file 1 118. Because storage extent identifier 400 has a length of 3, it spans inclusively from index 1 to index 3 within FMP map 120. Accordingly, a storage extent may span multiple logical blocks within FMP map 120 and may represent multiple physical blocks within data storage pool 130 and RAID array 102.

The physical block address of storage extent identifier 400 is 4. As can be seen from FIG. 4, this physical block address of 4 is associated with block 5 at index 4 within data storage pool 130. Because the length of storage extent identifier 400 is 3, three physical blocks are represented within storage extent identifier 400. Accordingly, blocks 5, 6, and 7 at indices 4, 5, and 6, respectively are shown to be associated with storage extent identifier 400 and are depicted with three arrows emanating from storage extent identifier 400 to data storage pool 130. Volume identifier 22 represents the physical volume with in RAID array 102 associated with these blocks. Because the state of storage extent identifier 400 is valid, as described above, this indicates that physical storage blocks have been allocated for use in association with storage extent identifier 400.

Multiple storage extents may be allocated with in system 100 for each FMP map, and each storage extent that is allocated may be represented by a storage extent identifier, such as storage extent identifier 400. Based upon this allocation tracking with in FMP server 104, a description of the interactions between FMP client 218 and FMP server 104 may now be detailed.

Figure 5A:
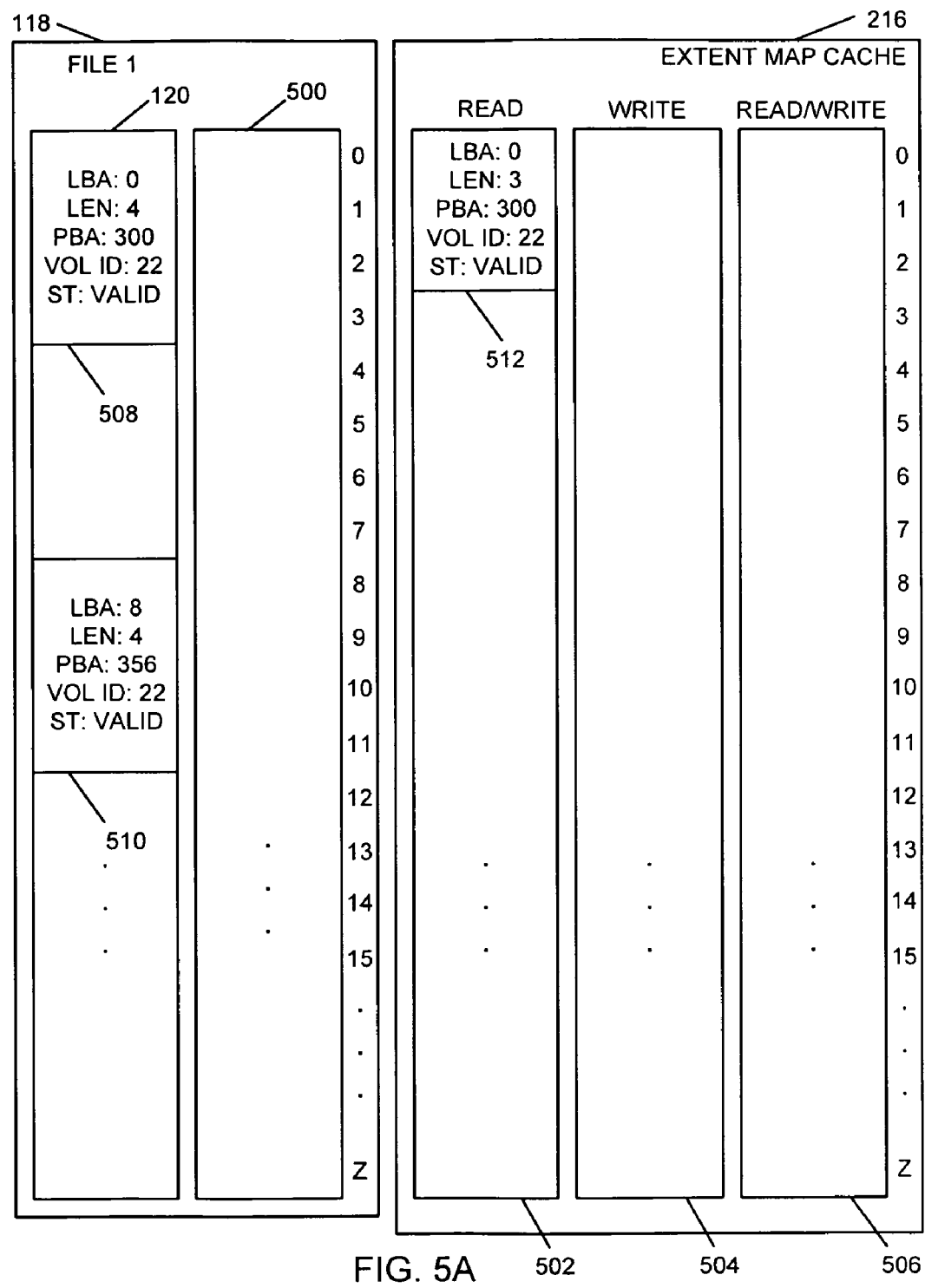
FIG. 5A illustrates an initial state of an exemplary storage extent map for a sequential interaction between an FMP client and an FMP server for a situation involving allocated regions within an FMP map according to an embodiment of the subject matter described herein.
Figure 5B:
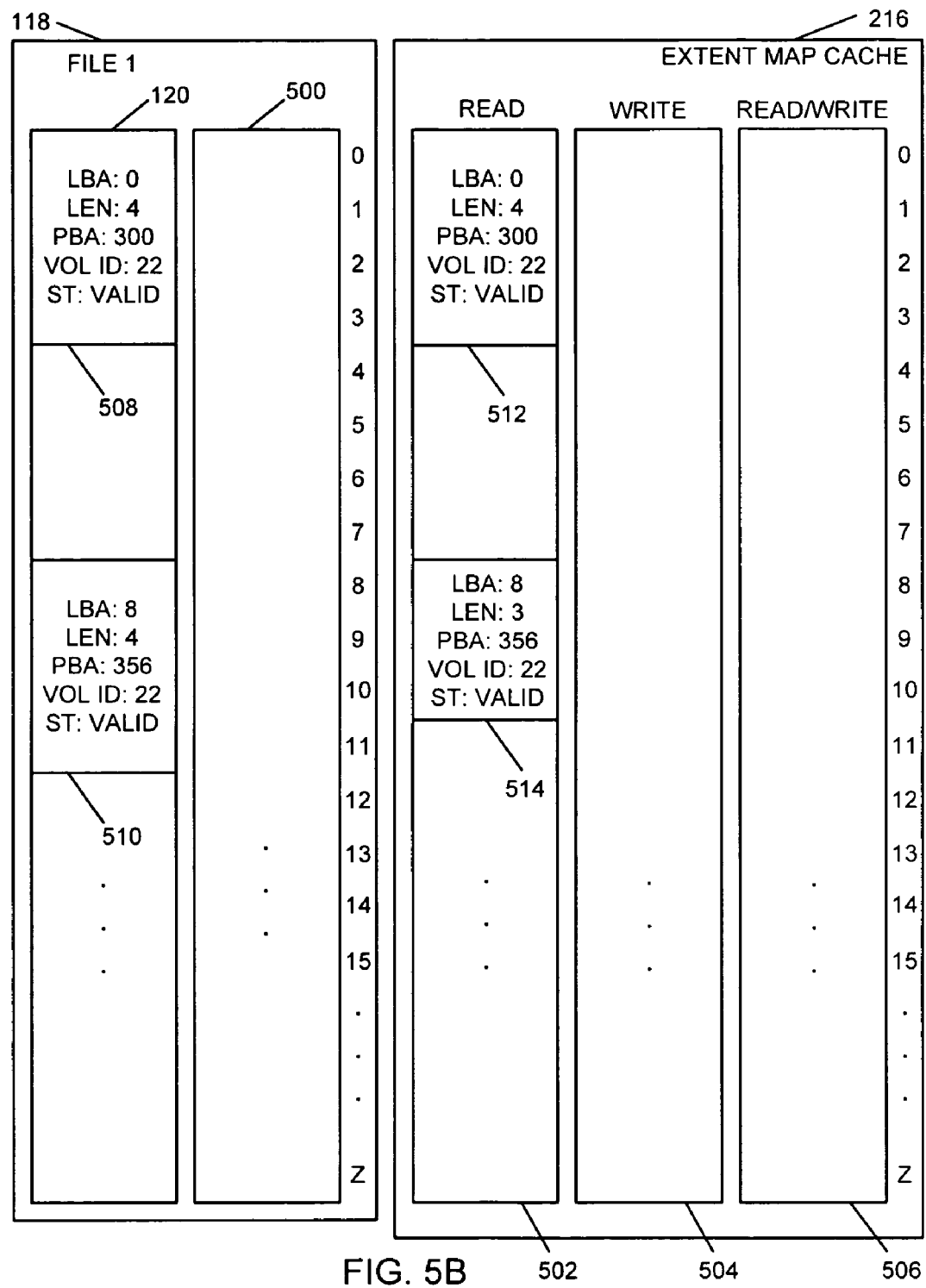
FIG. 5B illustrates an exemplary resulting read map after two read operations to allocated space, where the first is larger than a local mapping and where the second is to an region without a local map, according to an embodiment of the subject matter described herein.
Figure 5C:
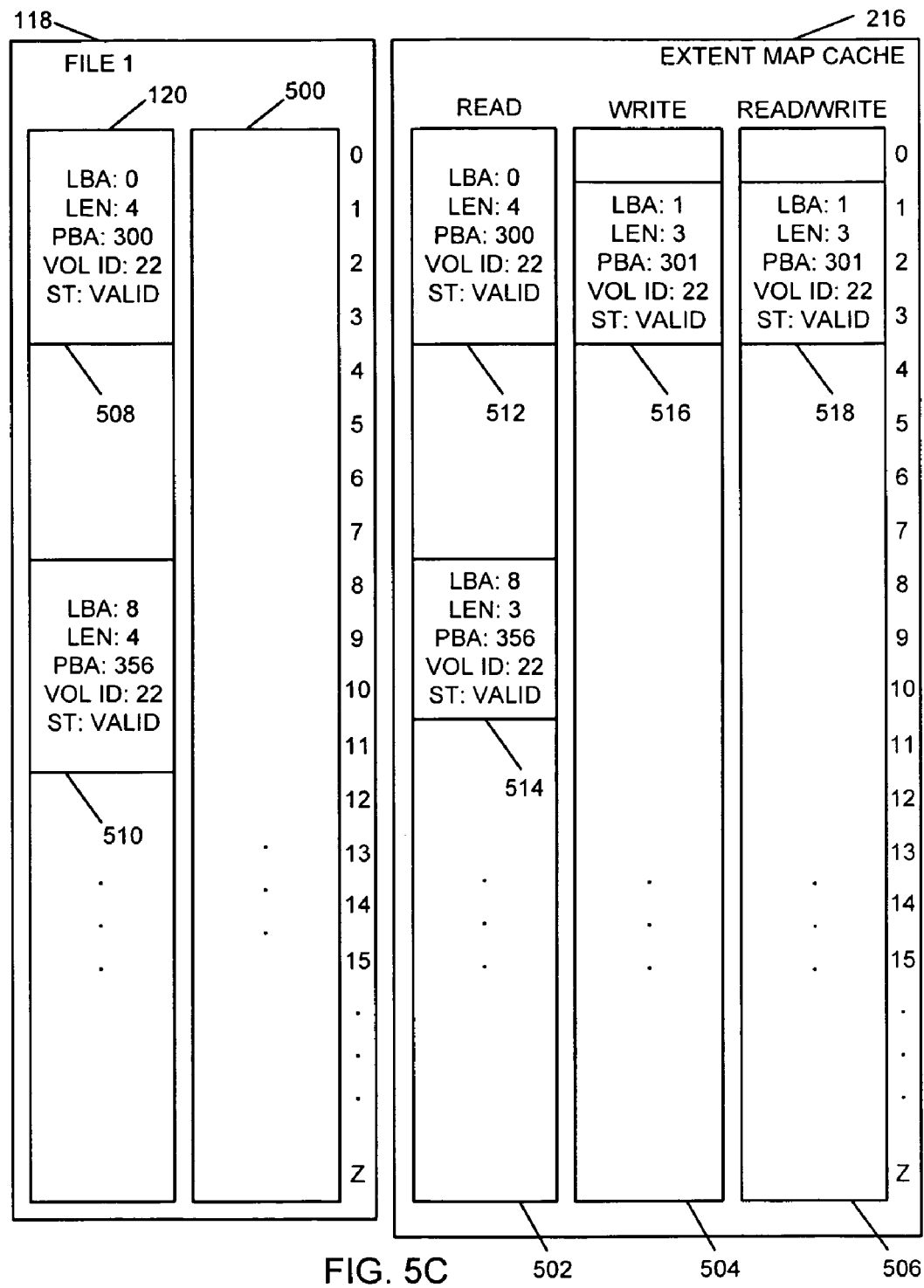
FIG. 5C illustrates an exemplary resulting write map and a resulting read/write map that results from a write operation to a valid allocated region of logical address space according to an embodiment of the subject matter described herein.

FIGS. 5A-5C illustrate exemplary storage extent map modifications for a sequential interaction between FMP client 218 and FMP server 104 for a situation involving allocated regions within an FMP map. For simplicity, FIGS. 5A-5C illustrate file and extent cache mappings that may be used by FMP server 104 and FMP client 218 and omit remaining portions of system 100. Accordingly, file 1 118 is shown to include FMP map 120 indexed from 0 to Z. As will be described in more detail below, write operations within system 100 may result in provisional allocations of storage extents. Accordingly, a provisional FMP map 500 is provided within file 1 118 to track provisional allocations of storage extents. Upon performance of a commit operation, storage extents may be promoted from provisional FMP map 500 to FMP map 120. As well, extent map cache 216 is shown to include a read map 502, a write map 504, and a read/write map 506. Each logical map within extent map cache 216 is indexed from 0 to Z to logically represent equivalent logical address regions associated with FMP map 120 with in file 1 118.

In order to better illustrate storage extent mapping within system 100, allocated regions of file 1 118 have been illustrated within FIG. 5A to include a storage extent identifier 508 and a storage extent identifier 510 within FMP map 120. Storage extent identifier 508 has a logical block address of 0, a length of 4, a physical block address of 300, a volume identifier of 22, and a state of valid. Storage extent identifier 510 has a logical block address of 8, a length of 4, a physical block address of 356, a volume identifier of 22, and a state of valid.

As illustrate in FIG. 5A and within storage extent identifier 508, a storage extent at a logical address of 0 with a length of 4 has been allocated at physical block address 300 with in volume 22 for this region of FMP map 120. The state of storage extent identifier 508 is valid to indicate that storage space has been allocated and committed, and that the space may be either read or written. Likewise, FIG. 5A illustrates that storage extent identifier 510 represents a storage extent at a logical block address of 8 with a length of 4 and a physical block address of 356 within volume 22. As with storage extent identifier 508, storage extent identifier 510 has a state of valid to indicate that storage space has been previously allocated for this region of the logical address map represented by FMP map 120.

This allocated region within FMP map 120 may be either a provisioned region or may exist as a result of the prior data write/commit operation. For purposes of this description, FIG. 5A may be considered an initial state for FMP map 120.

In response to a read request by application 202, FMP pseudo-device 208 may search for a read mapping for the logical region associated with the read request within extent map cache 216. Searches for read mappings may begin with a search for an entry within read/write map 506. If no entry is found within read/write map 506, read map 502 may be searched for a read mapping. FIG. 5A illustrates a storage extent identifier 512 within read map 502 having a logical block address of 0, a length of 3, a physical block address of 300 within volume 22 and a state of valid. Accordingly, a read request by application 202 within this region may yield a physical address of the storage extent allocated for this logical region. However, if application 202 requests a read operation at logical block address 0 with a length greater than 3 or at a logical block address greater than logical block address 3, a storage extent mapping sufficient to cover the entire region may not be present initially. In this situation, FMP client 218 may request a mapping for these regions from FMP server 104.

When a map entry exists for a location identified by a storage extent identifier and the extent covers the desired address range, FMP pseudo-device 208 may use the map entry to directly read data from the appropriate physical network disks. However, when no map exists in the cache or when a map entry exists but only partially covers the requested read range, FMP client 218 may send a request to FMP server 104 for a mapping. FMP server 104 may respond to this request with a read mapping to cover the range for the read request. In order to formulate the read mapping, FMP server 104 may read container file metadata included within FMP map 120 and may create an extent list describing the container file mapping for the requested region. File metadata may be stored within blocks of RAID array 102 or may be stored in a separate storage area on FMP server 104. FMP server 104 may then return the extent list as a readable map to FMP client 218.

For purposes of illustration, it will be assumed that a length of a requested read range generated by application 202 is larger than the mapping within storage extent identifier 512 of read map 502 for the region. The following illustrates an exemplary communication sequence between FMP client 218 and FMP server 104.

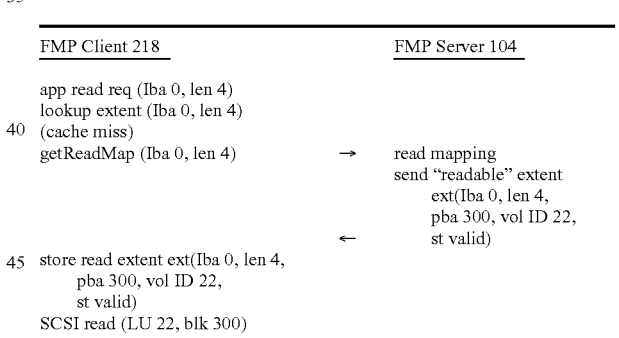

As can be seen from the sequence above, application 202 requests a read at logical block 0 with a length of 4. FMP client 218 performs a cache lookup for a storage extent to fulfill the read request, but there is no entry within the cache sufficient to cover the entire range of the read request, so a cache miss occurs. FMP client 218 then performs a getReadMap request to FMP server 104 for the region. FMP server 104 reads FMP map table 120 for a storage extent and sends a readable extent to FMP client 218. FMP client 218 then stores the readable extent in read map 502 and performs a direct SCSI disk access to read data in the allocated storage extent.

For regions where no read mapping exists, a similar sequence may occur. For purposes of illustration, the following description will assume that the above-described read request is issued a logical block address 0 with a length of 4 and that a separate read request is issued at address 8 with a length of 3. For the separate read request issued at address 8 with a length of 3, a similar extent lookup, cache miss, and mapping request may be performed for the region at address 8. It should be noted that both of these regions refer to regions within read map 502 that are initially either too small for the requested read range or regions that have no mapping. Further, both regions refer to space that has been allocated within FMP map 120 and that is marked as valid space. As described above, a storage extent may be marked valid when it has been allocated and committed.

FIG. 5B illustrates the resulting read map 502 after read mappings for both regions have been returned by FMP server 104 and stored in read map 502. As can been seen from FIG. 5B, storage extent identifier 512 now has been expanded to have a length of 4 with a state of valid. Because FMP map 120 already had space allocated for the expanded read range for the region at logical block address zero, FMP server 104 was able to return a valid read map for the entire four-block logical region associated with storage extent identifier 512 and storage extent identifier 508.

As can be seen from FIG. 5B, storage extent identifier 510 has allocated space of length 4 at logical block address 8. Accordingly, when a read request is issued for logical block address 8 with a length of 3 the read map returned by FMP server 104 includes previously allocated blocks. Accordingly, storage extent identifier 514 has been created within read map 502 with logical block address of 8 and a length of 3 mapping to physical block address 356 within volume 22. Because space has previously been allocated within FMP map 120, the state of the storage extent identifier 514 is valid.

With these read mappings stored within read map 502, node 1 108 may directly access the physical disks associated with storage extents represented by storage identifier 512 and 514 for all future read operations without use of FMP server 104. In this way, data read accesses have been decentralized, in contrast to conventional centralized block access systems.

Regarding write operations to allocated valid space, FIG. 5C illustrates a resulting write map and a resulting read/write map that results from a write operation to a valid allocated region of logical address space. As described above, a client may request an access mapping for a region associated with an application-level access request that is larger than the application-level access request. By requesting mappings that are larger than the current application-level request, a client may economize the map request process and reduce bandwidth requirements over time. Accordingly, within FIG. 5C, a write request targeted to logical block address 1 with a length of 2 is assumed to be desired by application 202. However, because FMP client 218 may request larger regions, the following request sequence may be generated by FMP client 218.

| FMP Client 218 | FMP Server 104 |
|---|---|
| app write req (lba 1, len 2) | |
| lookup extent (lba 1, len 2) | |
| (cache miss) | |
| allocSpace (lba 1, len 3) | → read mapping |
| | send "writeable" extent |
| | ext(lba 1, len 3, |
| | pba 301, vol ID 22, |
| ← | st valid) |
| store writeable extent ext(lba 1, len 3, | |
| pba 301, vol ID 22, | |
| st valid) | |
| SCSI write (LU 22, blk 301) | |

As can been seen from the request sequence above, application 202 issues a write request to logical block address 1 with a length of 2. FMP pseudo-device 208 performs a lookup for the extent within extent map cache 216, and a cache miss occurs. As described above, searches for writable mappings may begin with a search for an entry within read/write map 506. If no entry is found within read/write map 506, write map 504 may be searched for a write mapping. In response, FMP client 218 forms a request for space allocation and forwards that request to FMP server 104. Because FMP client 218 may request larger allocations than currently requested by application 202, FMP client 218 forms the request with a length of 3 at logical block address 1. In response, FMP server 104 reads FMP map 120 and formulates a "writeable" extent and forwards that extent to FMP map client 218. Upon receipt of the writeable extent, FMP client 218 modifies write map 504 with storage extent identifier 516. Storage extent identifier 516 illustrates that at logical block address 1 within the virtual address map represented by write map 504, a storage extent with a length of 3 that references physical block address 301 of volume 22 is now mapped. Further, the state of the mapping represented by storage extent identifier 516 is set to valid to indicate that the storage blocks represented have been both allocated and committed within FMP map 120 when the write request was issued. As can been seen from FIG. 5C, FMP client 218 had also created a storage extent identifier 518 within read/write map 506 for regions of overlap between read map 502 and write map 504 where the extent state is "valid."

As can also be seen from the above-referenced write request sequence, a SCSI write operation is preformed directly to disk without further intervention from FMP server 104. As will be described in more detail below, a write sequence may differ when storage extents have not been previously allocated, such as for sparsely-provisioned regions of the logical address space.

Figure 6A:
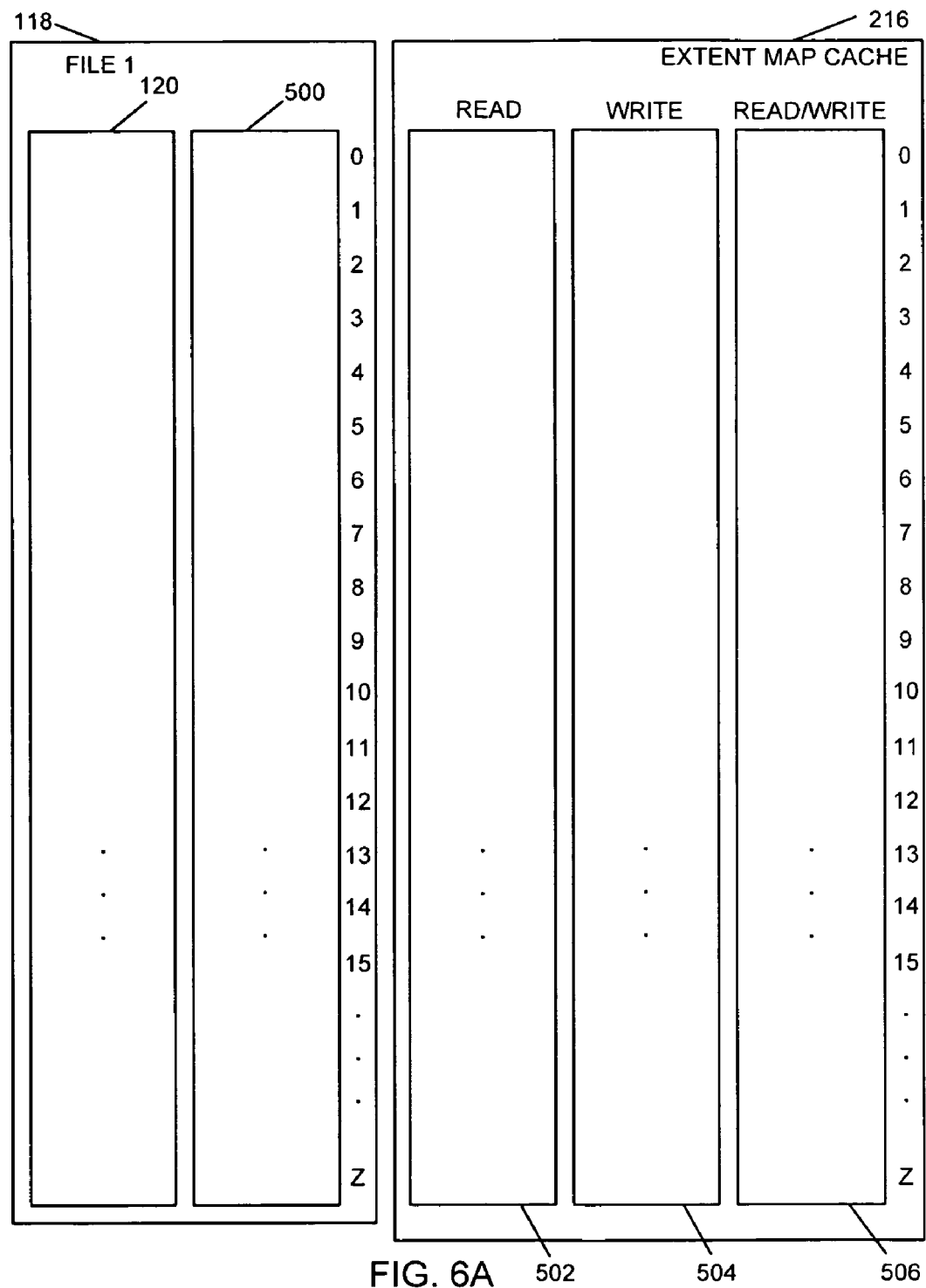
FIG. 6A illustrates an initial state of an exemplary storage extent map for a sequential interaction between an FMP client and an FMP server for a situation involving non-allocated regions within an FMP map according to an embodiment of the subject matter described herein.

FIGS. 6A-6D illustrate the results of read and write request for sparse regions of FMP map 120. FIG. 6A illustrates an initial state where no mapping exists within FMP map 120. Accordingly, no storage extents exist within read map 502, write map 504, and read/write map 506.

Figure 6B:
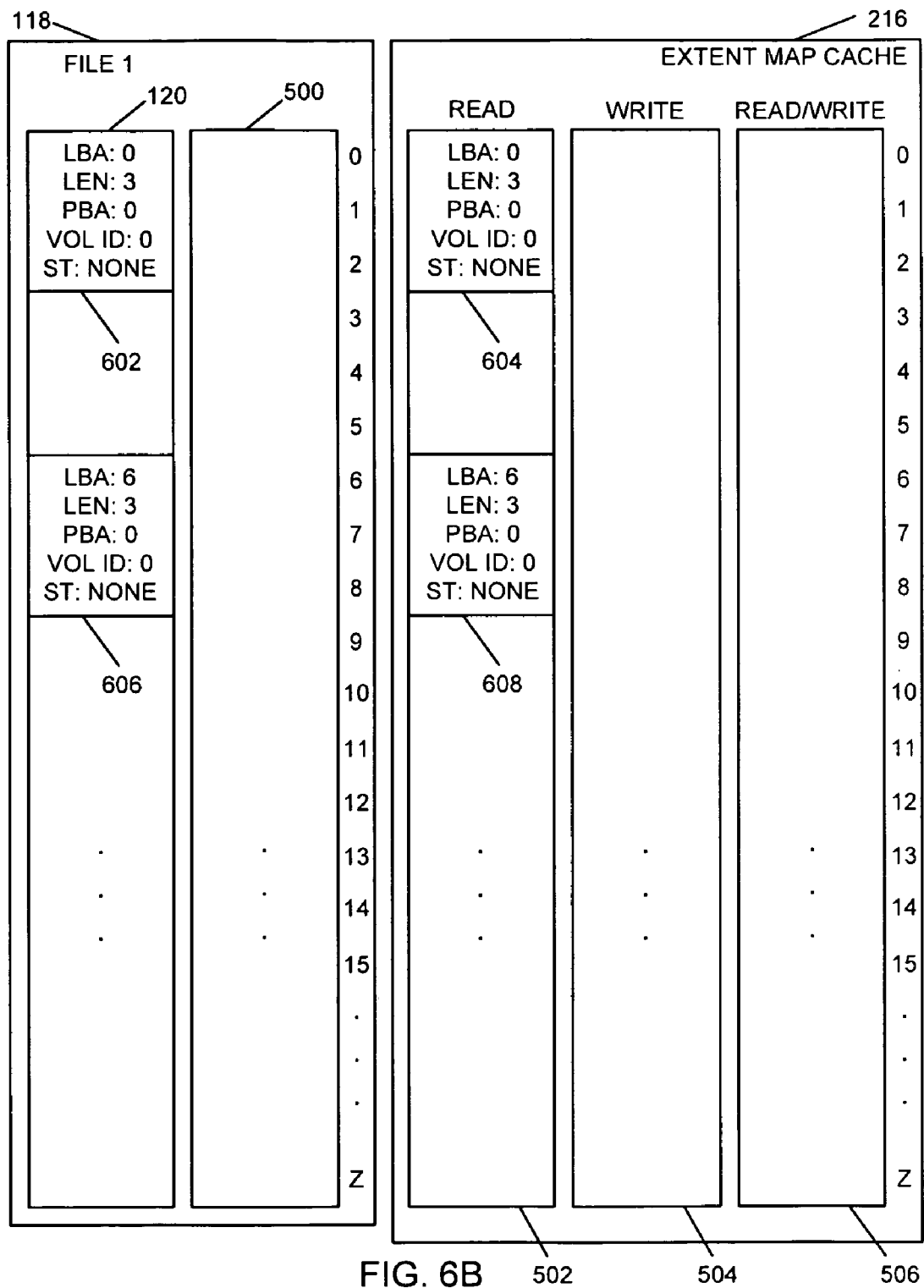
FIG. 6B illustrates an exemplary resulting read map after two read operations have been issued via a request to an FMP server, according to an embodiment of the subject matter described herein.

FIG. 6B illustrates a resulting read map after two read requests to FMP server 104 have been issued. Regarding a read request managed via a request to FMP server 104, the following read request will be assumed for a read request at logical block address 0. A similar request may be assumed for a read request at logical block address 6 and will not be detailed herein.

| FMP Client 218 | FMP Server 104 |
|---|---|
| app read req (lba 0, len 3) | |
| lookup extent (lba 0, len 3) | |
| (cache miss) | |
| getReadMap (lba 0, len 3) | → read mapping |
| | send "readable" extent |
| | ext(lba 0, len 3, |
| | pba 0, vol ID 0, |
| ← | st none) |
| zero-fill buffer and return | |

As can be seen from the above read request sequence, application 202 formulates a read request for logical block address 0 with a length of 3. FMP pseudo-device 208 performs a lookup for the region associated with the read operation, and a cache miss occurs. FMP client 218 performs a getReadMap request to FMP server 104 for the region. In response, FMP server 104 reads FMP map 120 and, as described above in relation to FIG. 6A, no mapping exists. Accordingly, FMP server 104 responds with a "readable" extent with a logical block address of 0, a length of 3, a physical block address of 0, a volume identifier of 0, and a state of "none." Because there is no allocated storage extent at logical block address 0 with a length of 3 and because no storage extents need to be allocated for a read operation, there is no physical device associated with the read mapping. Accordingly, default values for the physical block address and volume identifier fields may be provided within the mapping. A state identifier of "none" indicates that no storage blocks have been allocated for this storage extent.

As described above, a similar sequence may be assumed for a read request at logical block address 6. Accordingly, a "readable" extent may be assumed to have been returned by FMP server 104 with a logical block address of 6, a length of 3, a physical block address of 0, a volume identifier of 0, and a state of "none."

Referring to FIG. 6B, a storage extent identifier 602 has been created within FMP map 120, and a storage extent identifier 604 has been created within read map 502 to correspond to the mappings created by FMP server 104 and FMP client 218, respectively, in response to the read request sequence described above. Likewise, a storage extent identifier 606 has been created within FMP map 120, and a storage extent identifier 608 has been created within read map 502 to correspond to the mappings created by FMP server 104 and FMP client 218, respectively, in response to the second read request sequence described above.

Figure 6C:
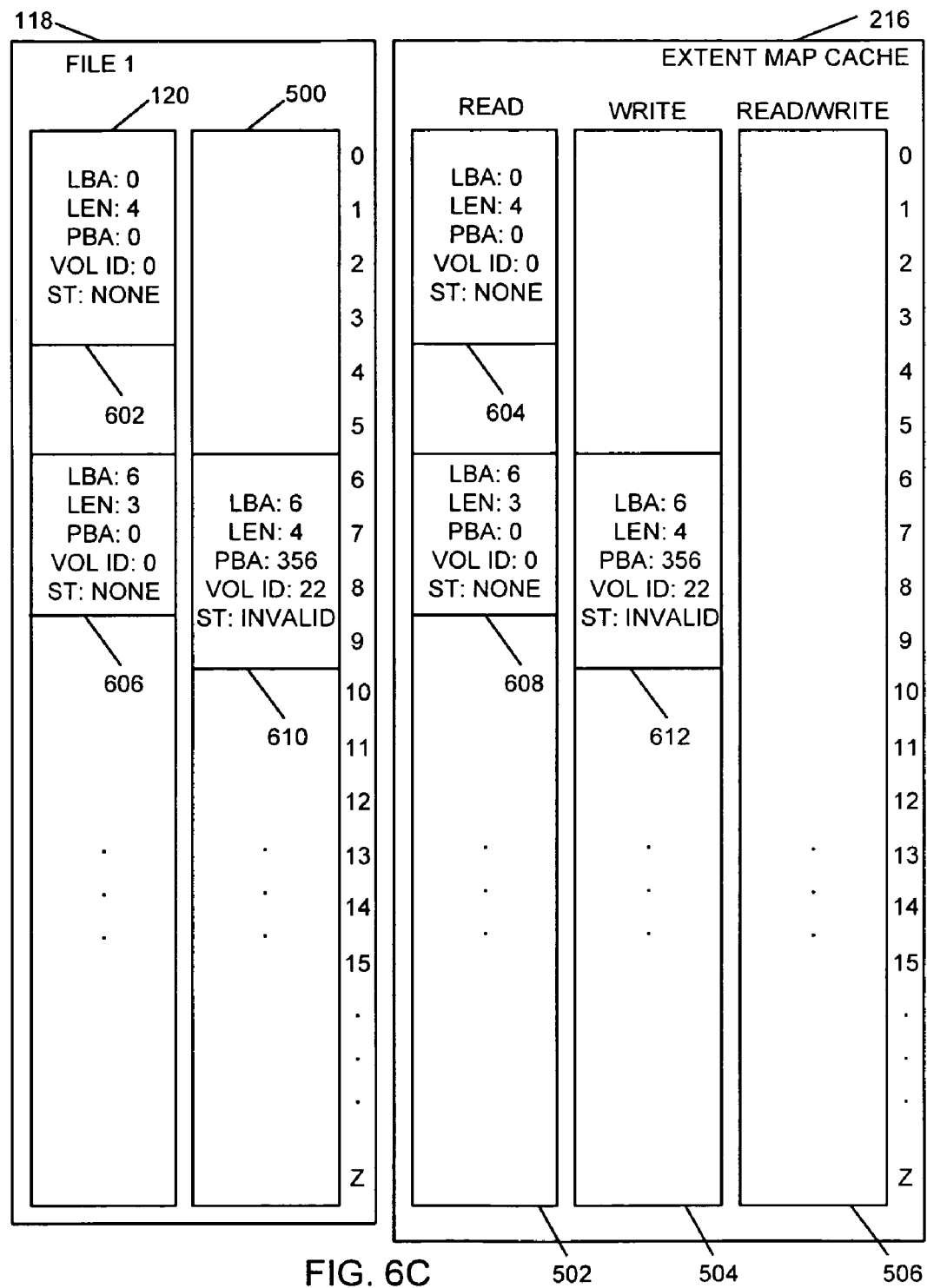
FIG. 6C illustrates an exemplary resulting read mapping to a region larger than a previously mapped read region and a resulting write mapping created after a write request to a previously unallocated region prior to a commit operation according to an embodiment of the subject matter described herein.

FIG. 6C illustrates a resulting read mapping to a region larger than a previously mapped read region and a resulting write mapping created after a write request to a previously unallocated region prior to a commit operation, where the write request is to a sparse region of FMP map 120 and the associated extent has been provisionally allocated by FMP server 104. This case is different from the read case described above because a write operation triggers the allocation of storage blocks for any unallocated regions associated with the request. The following request sequence illustrates the interaction between FMP client 218 and FMP server 104 for the write request at logical block address 6. A similar request may be assumed for a read request at logical block address 0 and will not be detailed herein.

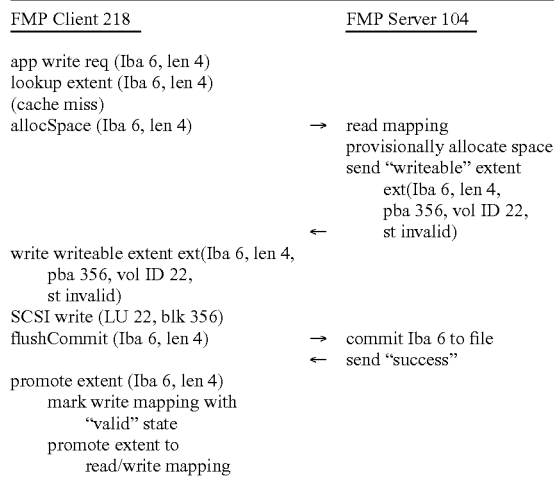

| FMP Client 218 | FMP Server 104 |
|---|---|
| app write req (lba 6, len 4) | |
| lookup extent (lba 6, len 4) | |
| (cache miss) | |
| allocSpace (lba 6, len 4) | → read mapping |
| | provisionally allocate space |
| | send "writeable" extent |
| | ext(lba 6, len 4, |
| | pba 356, vol ID 22, |
| | ← st invalid) |
| write writeable extent ext(lba 6, len 4, | |
| pba 356, vol ID 22, | |
| st invalid) | |
| SCSI write (LU 22, blk 356) | |
| flushCommit (lba 6, len 4) | → commit lba 6 to file |
| | ← send "success" |
| promote extent (lba 6, len 4) | |
| mark write mapping with | |
| "valid" state | |
| promote extent to | |
| read/write mapping | |

-continued

| | |
|---|---|
| | with "valid" state |
| | promote read mapping with |
| | "valid" state and expand |

As can be seen from the write request illustrated above, a write request is issued by application 202 for a logical block address 6 with a length of 4. FMP pseudo-device 208 performs an extent lookup with in extent map cache 216, and a cache miss occurs. In response, FMP client 218 issues an allocated space request to FMP server 104. FMP server 104 reads FMP map 120 and finds that no storage blocks are allocated for the region associated with the write request. Accordingly, FMP server 104 provisionally allocates space for the region associated with the write request within FMP map 120 and sends a "writeable" extent back to FMP client 218.

As described above, a similar sequence may be assumed for a read request at logical block address 0 with a length of 4. Accordingly, a "readable" extent may be assumed to have been returned by FMP server 104 with a logical block address of 0, a length of 4, a physical block address of 0, a volume identifier of 0, and a state of "none."

As can be seen form FIG. 6C, storage extent identifiers 602 and 604 have been increased in size to have a length of 4 in response to the read request that was larger than the associated mapped read regions within FMP map 120 and read map 502, respectively. As well, storage extent identifier 610 has been created within provisional FMP map 500 to indicate the provisional nature of the allocation and storage extent identifier 612 has been created within write map 504. Both storage extent identifier 610 and 612 correspond to a logical block address of 6 with a length of 4 and illustrate that a physical block of address 356 within volume 22 has been provisionally allocated for the region associated with this write request. Storage extent identifier 610 and storage extent identifier 612 have been set to a state of "invalid" to indicate that space has been provisionally allocated for a write operation, but that FMP server 104 has received no indication from FMP client 218 that data has been written to the provisionally allocated storage extent yet. Accordingly, the storage blocks associated with these storage extent identifiers do not contain valid data from the perspective of FMP server 104.

As described above, FMP pseudo-device 208 may perform the write operation to the physical storage blocks independently of FMP server 104 once a write map exists for a requested write region. Accordingly, the write request sequence illustrated above shows a SCSI write operation to the region associated with storage extent identifier 612. FMP pseudo-device 208 may respond to write requests from the application 202 repeatedly and complete the sequence with a commit request to FMP server 104 or may perform a commit operation after the initial write operation. The write request sequence illustrated above indicates that a flush commit request has been issued immediately following the SCSI write operation. Accordingly, FMP server 104 may commit the storage extent associated with storage identifier 610 to FMP map 120 by modifying metadata associated with the storage extent and may send a success command back to FMP client 218. The write request sequence illustrated above also indicates that in response to the successful commit operation, the storage extent associated with storage extent identifier 610 and storage extent identifier 612 may be promoted to a valid state and that a read/write mapping may be created for the region.

Figure 6D:
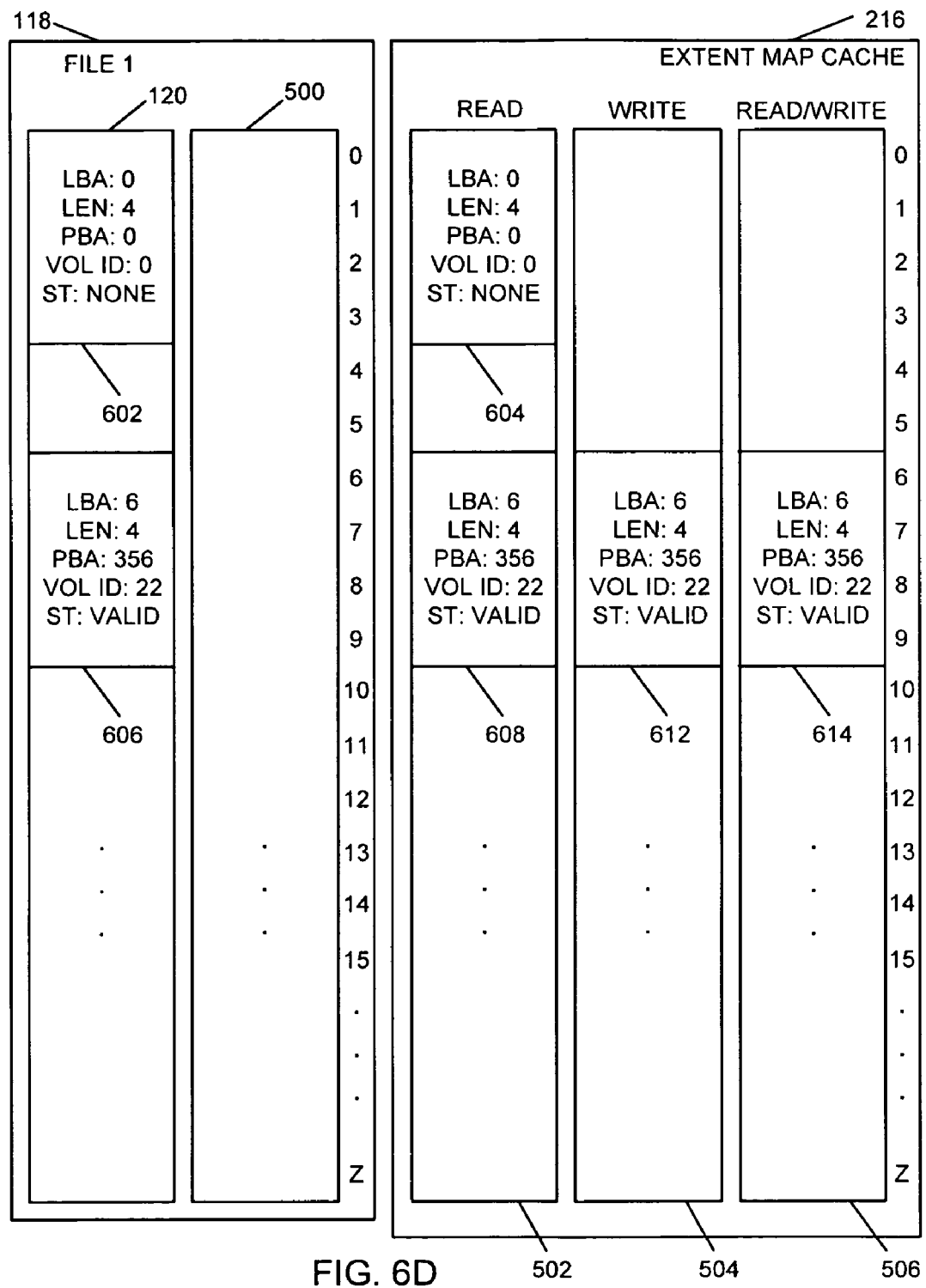
FIG. 6D illustrates an exemplary resulting write mapping after a write request to a previously unallocated region and after a commit operation has been performed according to an embodiment of the subject matter described herein.

FIG. 6D illustrates a resulting write mapping after a write request to a previously unallocated region and after a commit operation has completed. Accordingly, the state of storage extent identifier 606 has been changed to "valid" and its size has been increased to 4 to represent that a larger region is now available for both reading and writing data, and the state of storage extent identifier 612 has been changed to "valid." As well, because valid storage blocks have been committed by the commit operation, storage extent identifier 608 may be expanded from 3 blocks to 4 blocks coincident with the write region and its state may be changed from "none" to "valid." The physical block address and volume identifiers within storage extent identifier 608 have also been modified to 356 and 22, respectively, to indicate that valid storage blocks exist for the storage extent represented by storage extent identifier 608. Finally, storage extent identifier 614 has been created within read/write map 506 to indicate that the region is now readable and writeable, and that valid storage blocks exist for the storage extent associated with storage extent identifier 614. The commit operation has promoted the provisional allocation of storage extent identifier 610 to a non-provisional allocation mapped by storage extent identifier 606. Accordingly, storage extent identifier 610 is not depicted in FIG. 6D.

Snapshots of files may be made for archival purposes and to operate as restore points for older versions of data. In such a situation, older storage extents may be maintained for read purposes and new storage extents may be allocated for regions that are subsequently written. Accordingly, snapshots may be compact relative to the virtual addressable space when compared to conventional systems that archive all regions of the virtual addressable space.

Figure 7A:
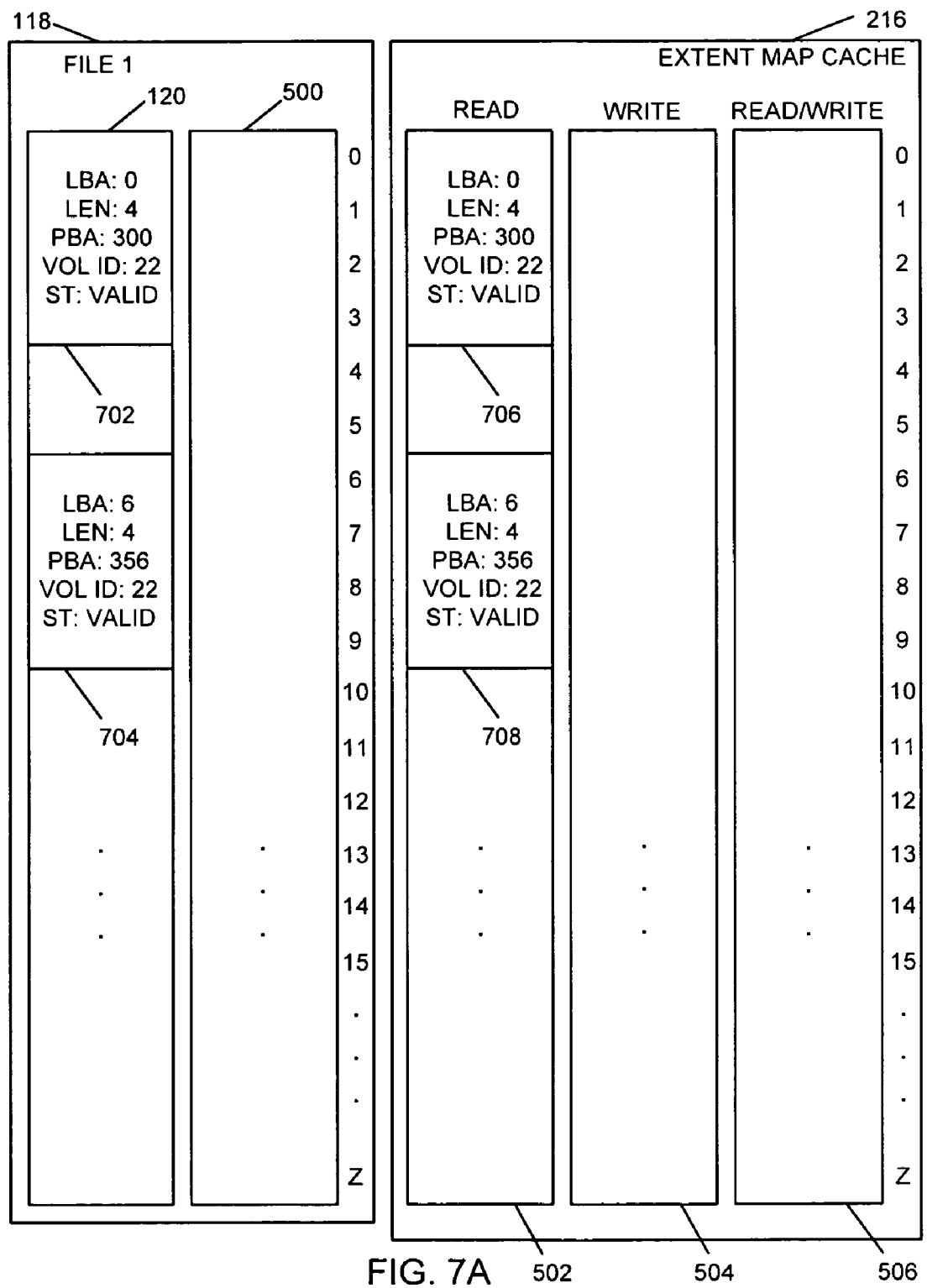
FIG. 7A illustrates an initial state of an exemplary storage extent map based upon a point-in-time copy (snapshot) of a file for a sequential interaction between an FMP client and an FMP server for a situation involving allocated regions within an FMP map according to an embodiment of the subject matter described herein.
Figure 7B:
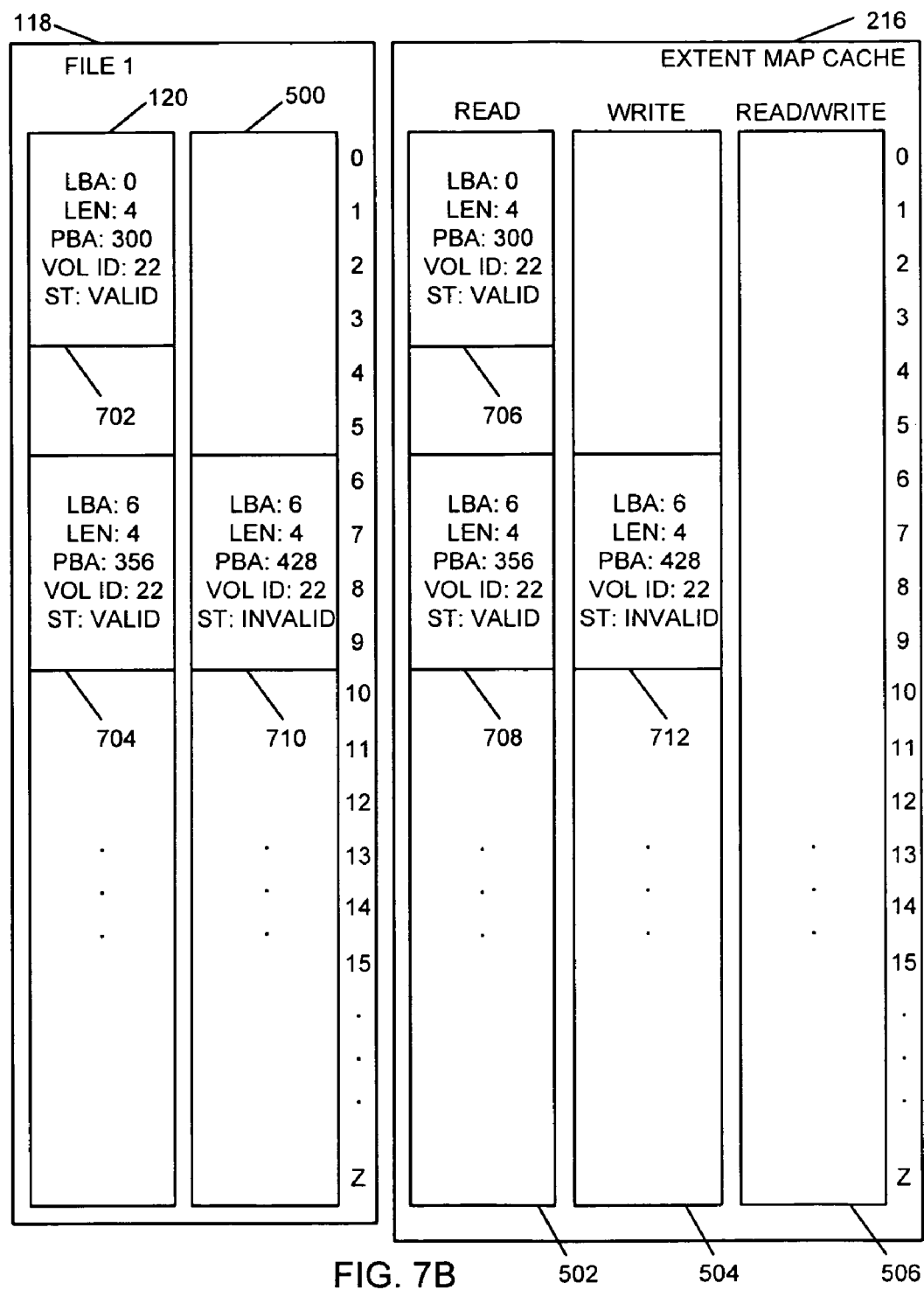
FIG. 7B illustrates an exemplary resulting write mapping created after a write request to a non-owner region of a file with snapshots prior to a commit operation according to an embodiment of the subject matter described herein.
Figure 7C:
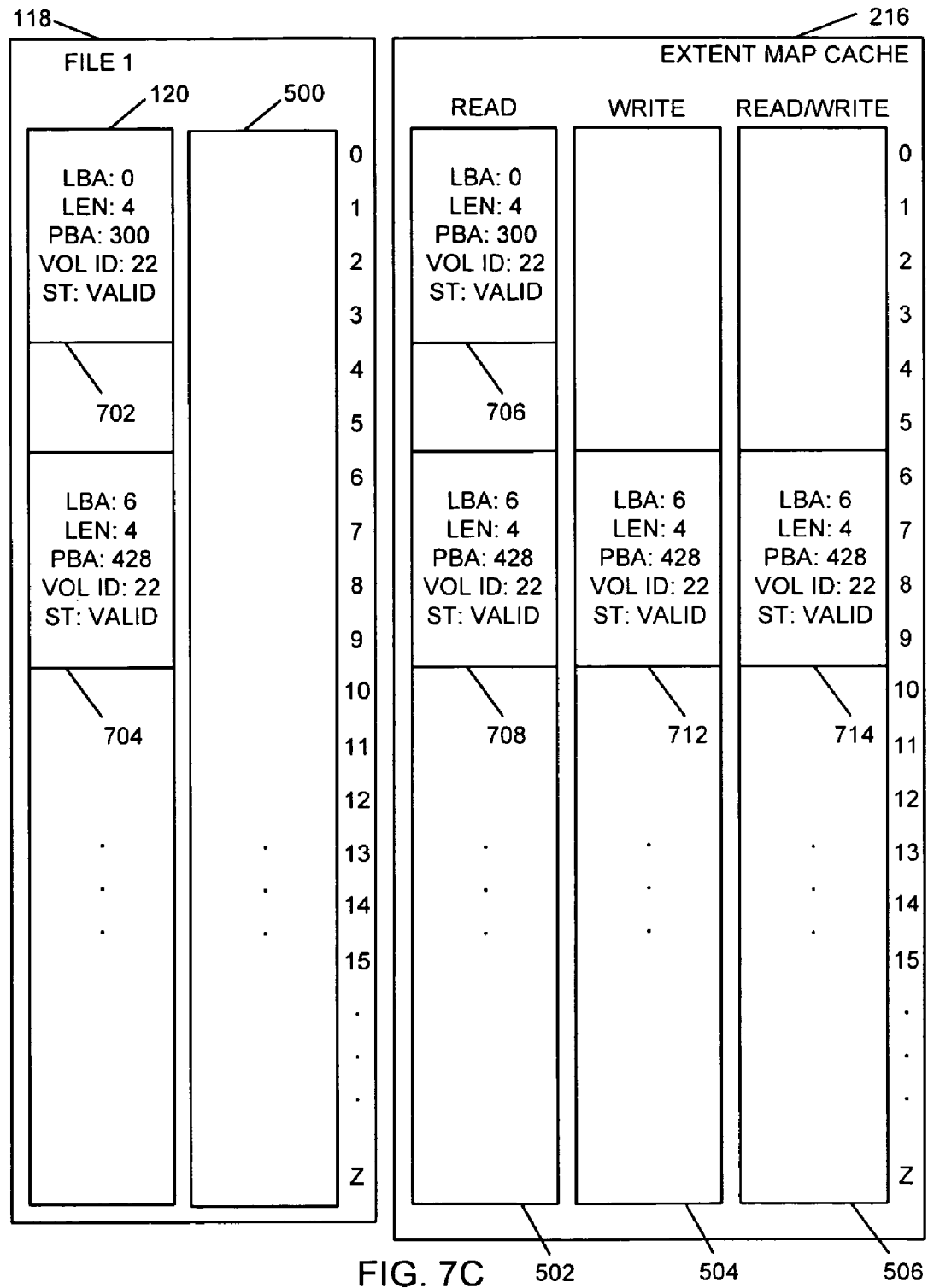
FIG. 7C illustrates an exemplary resulting mapping after data has been written to a non-owner region of a file with snapshots and a commit operation has been performed according to an embodiment of the subject matter described herein.

FIGS. 7A-7C illustrate the results of read and write requests for non-owner regions of a virtual address space. Non-owner regions refer to those blocks of a file which have not been overwritten since a previous snapshot was created. Accordingly, non-owner regions represent regions of a file which may be preserved as part of a snapshot. These snapshots may further include recently created snapshots and snapshots retrieved from storage and operating as restore points for previous versions of data within the virtual address space.

Because a snapshot is a logical construct associated with the state of data at a given point and time, changes from that point may be tracked relative to the state of the data at the time of the snapshot. Accordingly, a snapshot may be thought of as a collection of mappings allocated by previous write operations.

FIG. 7A illustrates an initial state of an exemplary storage extent map based upon a snapshot for a sequential interaction between an FMP client and an FMP server for a situation involving allocated regions within an FMP map after a snapshot of file 1 118 has been made and prior to any subsequent write operations to file 1 118. When a snapshot of a file is made, only read mappings will be presented to an application to prevent inadvertent writes to the snapshot. Write mappings may be generated by allocating new regions, as described above for an unallocated case and as will be described in more detail below.

FMP map 120 includes a storage extent identifier 702 and a logical block address of 0 with a length of 4 that is associated with a physical block address of 300 in volume ID 22 of RAID array 102. Storage extent identifier 702 has a "valid" state because storage extents have been previously allocated for this storage extent. Storage extent identifier 704 represents a storage extent at logical block address 6 with a length of 4 that is associated with a physical block address of 356 in volume 22 of RAID array 102. The state of the storage extent represented by storage extent identifier 704 is also valid because storage extents have been previously allocated for this storage extent.

Read map 502 includes two storage extent identifiers, a storage extent identifier 706 and a storage extent identifier 708, that may have been created during previous read requests or that may be provided upon creation or restoration of a snapshot to facilitate read requests to any allocation regions of the snapshot. Storage extent identifier 706 includes mappings identical to storage extent identifier 702 and storage extent identifier 708 includes mappings identical to storage extent identifier 704.

FIG. 7B illustrates a resulting write mapping created after a write request to a non-owner region of a file with snapshots prior to a commit operation. This write request may be assumed to have been issued to the logical address space represented by storage extent identifiers 704 and 708. Because a snapshot of file 1 118 was made, any new write requests will result in new block allocations for affected storage extents. Accordingly, as can be seen from FIG. 7B, a storage extent identifier 710 has been created within provisional FMP map 500 to point to a new physical block address which represents the logical block address of 6 with a length of 4, a new physical block address of 428 within volume 22. The state of storage extent identifier 710 is "invalid" to indicate that any write operations performed by node 1 108 have not yet been committed to FMP map 120. A storage extent identifier 712 has been created within write map 504 to represent the storage extent returned to FMP client 218 by FMP server 104. The contents of storage extent identifier 712 represent the same mappings as the provisional allocation of storage extent identifier 710 and are likewise considered to be invalid until a commit operation has been performed.

A write request sequence similar to the one described above for unallocated space within a virtual address map may be used to request allocation of space for non-owner regions. Because data within snapshots may be preserved, non-owner regions may be considered read only, any write requests to a non-owner regions may result in new block allocations, as described above.

While a write request to a non-owner region may result in a new allocation of blocks for the storage extent represented by storage extent identifiers 704 and 708, FIG. 7B illustrates that any read request may still be serviced from the physical blocks associated with the non-owner region prior to the write request. Until a commit operation has been performed, all read requests may be serviced by the original physical blocks. Accordingly, storage extent identifiers 704 and 708 still reference a physical block address of 356 within volume 22 and have a valid state.

FIG. 7C illustrates the resulting mapping after data has been written to a non-owner region of a file with snapshots and a commit operation has been performed. For purposes of illustration, FMP pseudo-device 208 may be assumed to have written data to physical disks located at a physical block address of 428 within volume 22 and FMP client 218 may be assumed to have issued a commit request which has been granted by FMP server 104. Accordingly, storage extent identifier 704 has been modified to point to the newly-committed physical storage at physical block address 428 in volume 22, rather than the previous storage extent at physical block address 356, and the state has been marked as valid. Further, storage extent identifier 712 has also been marked valid. Storage extent identifier 708 has also been updated to point to the newly-committed physical storage at physical block address 428 in volume 22, rather than the previous storage extent at physical block address 356, and the state has been marked as valid. As described above, a storage extent identifier 714 has been created in read/write map 506 to reflect that the storage extent reference is both readable and writeable and that the state is valid. The valid state for storage extent identifier 714 within read/write map 506 of FIG. 7C indicates that storage blocks have both been allocated and committed to that region of the virtual address space. Accordingly, storage extent identifier 714 may be used for read and write operations.

FIGS. 5A-5C, 6A-6D, and FIGS. 7A-7C reflect updates to extent map cache 216 in response to read and write operations to allocated regions, sparse regions, and non-owner regions of an FMP map, respectively. The details of the scenarios described above may be utilized concurrently by multiple nodes within cluster 106 to access disks within RAID array 102 directly using storage extent mappings within an FMP map of a single file. Further, multiple files may be used by multiple nodes within cluster 106 without departing from the scope of the subject matter described herein.

System 100 provides for dynamic allocation of physical storage blocks to form storage extents that may be represented within read and write mappings on nodes within a cluster, such as cluster 106, to provide nodes within the cluster the capability of directly accessing physical disk storage without funneling all disk related I/O through a server, such as FMP server 104. FMP server 104 may maintain a centralized disk storage map for each file associated with each node of cluster 106 and may provide mappings for regions in response to requests by an FMP client, such as FMP client 218 within node 1 108 of cluster 106. FMP server 104 and FMP client 218 may provide logical mappings for read operations without allocation of physical storage blocks. FMP server 104 may allocate physical storage blocks to create logical storage extents for regions of virtual address space represented within an FMP map, such as FMP map 120, in response to write requests. When a write operation is performed by a node within cluster 106 directly to physical disk storage for an allocated storage extent within RAID array 102, and a commit operation is performed, mappings may be promoted to a read/write mapping and all mappings within an extent map cache, such as extent map cache 216, may be marked valid. By providing these capabilities, cluster computing system 100 may improve performance for cluster and grid computing systems by reducing the bottleneck associated with conventional block access systems.

Figure 8:
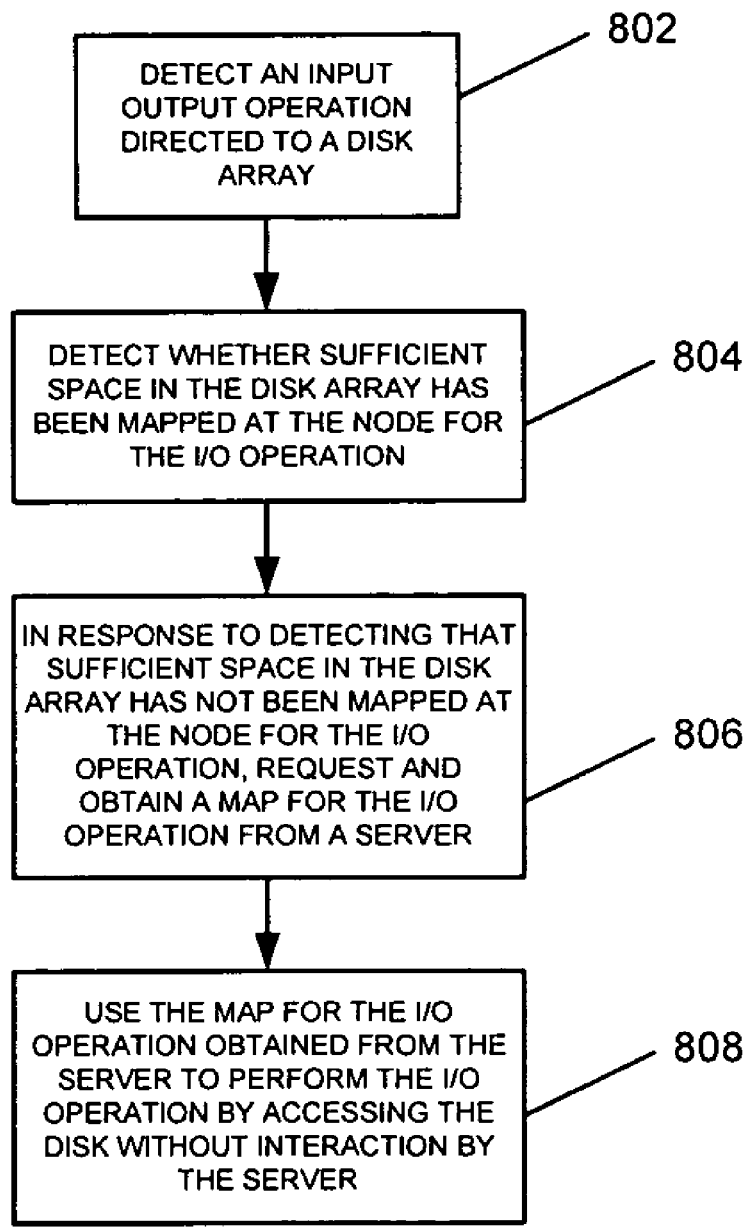
FIG. 8 is a flow chart illustrating an exemplary decentralized direct access process for use to allow multiple nodes within a cluster to directly access physical storage devices according to an embodiment of the subject matter described herein.

FIG. 8 illustrates an exemplary decentralized direct access process for use to allow multiple nodes within a cluster to directly access physical storage devices without use of a centralized file access server. At block 802, the process may at a node in a grid of nodes sharing access to a disk array, detect an application input/output (I/O) operation. For example, FMP pseudo-device 208 may detect an application I/O operation from application 202.

At block 804, the process may detect whether sufficient space in the disk array has been mapped at the node for the I/O operation. For example, FMP pseudo-device 208 may search extent map cache 216 for an I/O map associated with the region of the I/O operation.

At block 806, the process may, in response to detecting that sufficient space in the disk array has not been mapped at the node for the I/O operation, request and obtain a map for the I/O operation from a server. For example, FMP client 218 may request an I/O map associated with the region of the I/O operation from FMP server 104.

At block 808, the process may use the map for the I/O operation obtained from the server to perform the I/O operation by accessing the disk array without interaction by the server. For example, FMP pseudo-device 208 may access RAID array 102 directly without further interaction by FMP server 104 by using the I/O map provided by the server and SCSI device 210.

Figure 9:
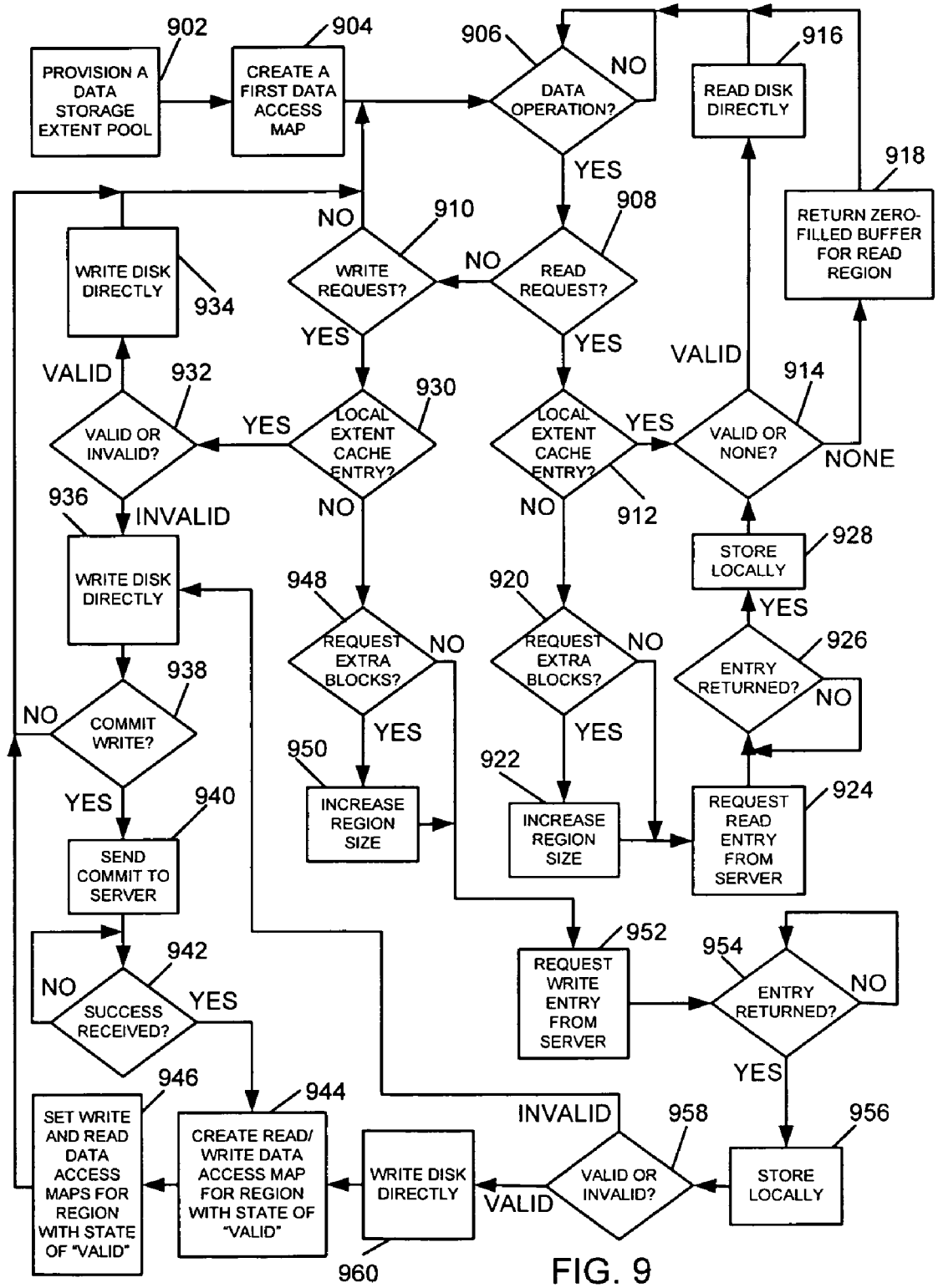
FIG. 9 is a flow chart illustrating an exemplary client-side decentralized direct access process for providing nodes within a cluster or a grid system with the capability of directly accessing physical disks according to an embodiment of the subject matter described herein.

FIG. 9 illustrates an exemplary client-side decentralized direct access process for providing nodes within a cluster or a grid system with the capability of directly accessing physical disks. At block 902, the process may provision the data storage extent pool. At block 904, a first data access map may be created and at decision point 906, the process may wait for a data operation to be requested.

When a data operation has been requested at decision point 906, the operation may be parsed at decision point 908 to determine whether the data operation is a read request. When the data operation is not a read request, the data operation may be further parsed at decision point 910 to determine whether the data operation is a write request. For ease of illustration, error handling procedures will not be described herein. Accordingly, if the data operation is determined not to be a write request at decision point 910, the process may return to decision point 906 to await a new data operation. Many error handling procedures are possible for handling parsing errors related to data operations and all are considered within the scope of the subject matter described herein.

When the process determines that a read request has been issued at decision point 908, a determination may be made at decision point 912 as to whether a local extent cache entry exists for the region. A local extent cache entry may exist for the region in response to provisioning activities or as a result of a previous read request. When a local extent cache entry does exist for the region, a determination may be made at decision point 914 as to whether the state of the storage extent is "valid" or "none." When the local storage extent is determined to have a state of "valid," the process may directly read the physical storage disks without use of a centralized block virtualization appliance as required in conventional systems at block 916. After reading the physical disk directly at block 916, the process may return to decision point 906 to await a new data operation. When a determination has been made at decision point 914 that the state of the storage extent is "none," the process may return a zero-filled buffer for the region at block 918 and the process may return to decision point 906 to await a new data operation.

When a decision has been made at decision point 912 that there is not a local extent cache entry for the region, the process may request a read map from a remote source. A decision may be made at decision point 920 as to whether to request extra blocks for the region. As described above, extra blocks may be requested for a region to economize on request accesses and to populate data access maps for future use. When a decision has been made at decision point 920 to request extra blocks, the region size for the read request may be increased at block 922. Upon increase of the region size at block 922 or when no extra blocks are requested at decision point 920, the process may request a read access map for the region from a server at block 924. The process may wait for the read entry to be returned at decision point 926 and may store the returned entry locally at block 928 when the entry is returned. Processing may continue to decision point 914, as described above with the case of a locally cached entry, upon storage of the returned entry at block 928. Error handling procedures will not be described herein for management of interactions between a process such as the process described and a server. However, many procedures exist for management of issues involving the interoperation of the process and a remote server. Accordingly, all are considered within the scope of the subject matter described herein.

When a data operation has been determined to be a write request at decision point 910, the process may determine whether a local extent cache entry exists for the region at decision point 930. A local extent cache entry may exist for the region in response to provisioning activities or as a result of a previous write request. When a local extent cache entry does exist for the region, a determination may be made at decision point 932 as to whether the state of the storage extent is "valid" or "invalid." When the local storage extent is determined to have a state of "valid," the region may be considered to have been previously allocated and committed, and the process may write the disk directly at block 934 and may return to decision point 906 to await the next data operation. When the local storage extent is determined to have a state of "invalid," the region may be considered to have been previously allocated but not committed, and the process may write the disk directly at block 936.

The process may determine at decision point 938 whether to perform a commit operation. When a commit operation is not to be performed, the process may return to decision point 906 to await the next data operation. When a commit operation is to be performed, the process may send a "commit" message to the server at block 940 and may wait for a "success" response from the server at decision point 942. As described above, error handling procedures will not be described herein for management of interactions between a process such as the process described and a server. However, many procedures exist for management of issues involving the interoperation of the process and a remote server. Accordingly, all are considered within the scope of the subject matter described herein.

Upon receipt of a "success" response from the server at decision point 942, the process may create a read/write entry for region with a state of "valid" at block 944. The process may also set any read or write entries for the region to "valid" at block 946 and may return to decision point 906 to await the next data operation.

When a determination is made at decision point 930 that a local extent cache entry does not exist for the region, the process may make a determination at decision point 948 as to whether to request extra blocks for the region. As described above, extra blocks may be requested for a region to economize on request accesses and to populate data access maps for future use. When a decision has been made at decision point 948 to request extra blocks, the region size for the write request may be increased at block 950. Upon increase of the region size at block 950 or when no extra blocks are requested at decision point 948, the process may request a write access map for the region from a server at block 952. The process may wait for the write entry to be returned at decision point 954 and may store the returned entry locally at block 956 when the entry is returned. As described above, error handling procedures will not be described herein for management of interactions between a process such as the process described and a server. However, many procedures exist for management of issues involving the interoperation of the process and a remote server. Accordingly, all are considered within the scope of the subject matter described herein.

Upon storage of the received read entry at block 956, a determination may be made at decision point 958 as to whether the returned block has a state of "valid" or "invalid." When a determination has been made that the returned block has a state of "invalid," the process may continue to block 936 to write the physical disk directly and processing may continue as described above to determine whether a commit operation is to be performed at decision point 938. When a determination has been made that the returned block has a state of "valid," the process may continue to block 960 to write the physical disk directly and processing may continue as described above to create a read/write map for the region and to set the state of any existing read or write maps for the region to "valid" at blocks 944 and 946, respectively. As described above, a region may be returned with a valid state when a previous allocation and commit operation has been performed.

As described above, the process may be used to provide direct disk storage access capabilities to nodes within a cluster, such as cluster 106. By decentralizing disk storage access and allowing nodes within a cluster or grid to access disk storage devices directly, bandwidth requirements at a server, such as FMP server 104, may be reduced and disk access performance may be improved.

Figure 10:
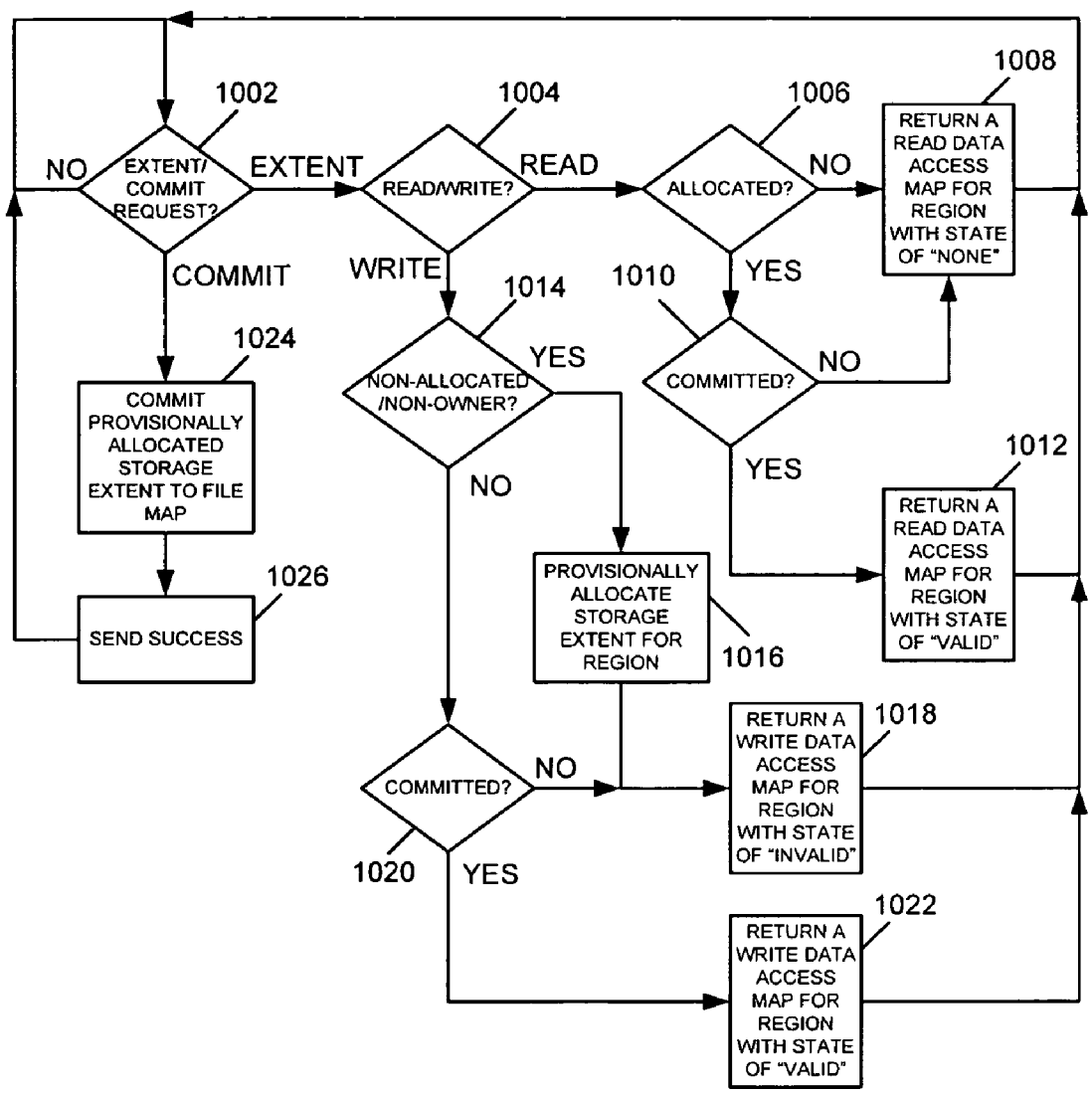
FIG. 10 is a flow chart illustrating an exemplary server-side decentralized direct access process for providing nodes within a cluster or a grid system with the capability of directly accessing physical disks according to an embodiment of the subject matter described herein.

FIG. 10 illustrates an exemplary server-side decentralized direct access process for providing nodes within a cluster or a grid system with the capability of directly accessing physical disks. At decision point 1002, the process may wait for an extent request or a commit request to be received.

When an extent request is received, the process may determine at decision point 1004 whether the request is a read request or a write request. When the request is determined to be a read request, the process may determine whether a storage extent has been previously allocated to fulfill the request at decision point 1006. As described above, a storage extent may be previously allocated as a result of a provisioning operation or as a result of a previous write operation. When a determination is made that a storage extent to fulfill the read request has not been previously allocated, a storage extent data access map may be returned for the region at block 1008 with a state of "none" to indicate that no storage has been allocated for the region and the process may return to decision point 1002 to await a new request.

When a determination is made at decision point 1006 that a storage extent to fulfill the read request has been previously allocated, a determination may be made at decision point 1010 as to whether the region associated with the request has been previously committed. When the region associated with the request has not been previously committed, the process may return a storage extent data access map for the region at block 1008 with a state of "none" to indicate that no storage has been committed for the region and the process may return to decision point 1002 to await a new request. When the region associated with the request has been previously committed, the process may return a read storage extent data access map for the region at block 1012 with a state of "valid" to indicate that storage has been allocated and committed for the region and the process may return to decision point 1002 to await a new request.

When a determination is made at decision point 1004 that the request is a write request, the process may determine whether a storage extent has not been previously allocated to fulfill the request or whether the region is a non-owner region at decision point 1014. As described above, a storage extent may be previously allocated as a result of a provisioning operation or as a result of a previous write operation. Non-owner regions refer to those blocks of a file which have not been overwritten since a previous snapshot was created. Accordingly, non-owner regions represent regions of a file which may be preserved as part of a snapshot.

When a determination is made that a storage extent to fulfill the write request has not been previously allocated or is a non-owner region, a storage extent for the region associated with the write request may be provisionally allocated at block 1016. A storage extent data access map may be returned for the region at block 1018 with a state of "invalid" to indicate that the storage has been provisionally allocated for the region and that a commit operation has not yet been performed, and the process may return to decision point 1002 to await a new request.

When a determination is made that a storage extent to fulfill the write request has been previously allocated and is not a non-owner region, a determination may be made at decision point 1020 as to whether the region associated with the request has been previously committed. When the region associated with the request has not been previously committed, the process may return a storage extent data access map for the region at block 1018 with a state of "invalid" to indicate that the storage has been provisionally allocated for the region and that a commit operation has not yet been performed, and the process may return to decision point 1002 to await a new request. When the region associated with the request has been previously committed, the process may return a write storage extent data access map for the region at block 1022 with a state of "valid" to indicate that storage has been allocated and committed for the region and the process may return to decision point 1002 to await a new request.

When a determination is made at decision point 1002 that a commit operation has been requested, the process may commit a provisionally allocated storage extent to a file map at block 1024. The process may send a "success" response at block 1026 and may return to decision point 1002 to await a new request.

As an alternate to a commit operation associated with each allocation of a storage extent, bandwidth requirements may further be improved by gathering commit operations and submitting them in sets to FMP server 104. Because many write requests may arrive at FMP pseudo-device in parallel, gathering commit operations may improve bandwidth and performance for commit operations.

As another alternative, an "intent log" may be maintained within an FMP client such as FMP client 218, to improve recovery performance in the event that a client crashes prior to performing a commit operation. When a client reboots or recovers from a crash, it may search its intent log and perform commit operations for any previously uncommitted allocations. In this way, commit operations may be periodically scheduled or may be asynchronously performed while still preserving stateful information related to storage extents that are allocated.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing access to shared storage by a plurality of nodes, the method comprising:
at a client node of a plurality of nodes separate from and sharing access to a disk array:
(a) detecting a first application input/output (I/O) operation;
(b) detecting whether sufficient space in the disk array has been mapped at the node for the first application I/O operation;
(c) in response to detecting that sufficient space in the disk array has not been mapped at the client node for the first application I/O operation, requesting, from a server, and obtaining, from the server, a map including physical disk access information for the first application I/O operation, wherein the physical disk access information includes a physical address of a location within a disk of the disk array; and
(d) performing the first application I/O operation by accessing the disk array without intervention by the server using the physical disk access information included within the map for the application I/O operation obtained from the server, wherein the client node maintains the map and uses the map for subsequent application I/O operations including accessing physical disks of the disk array directly without interaction with the server.

2. The method of claim 1 wherein the first application I/O operation includes a write request and wherein the write request is performed by writing data to the disk array without intervention by the server and wherein the map for the first application I/O operation obtained from the server includes a write data access map.

3. The method of claim 2 comprising, at the server, allocating at least one data storage block in the disk array to create a data storage extent for a region of a virtual address space associated with the write request.

4. The method of claim 3 comprising, at the server, creating the physical disk access information and logical storage extent access information associated with the created data storage extent at a logical location for the region of the virtual address space associated with the write request and marking a state of the physical disk access information as invalid within the map for the first application I/O operation.

5. The method of claim 4 wherein accessing the disk array without intervention by the server to perform the write request includes storing data associated with the write request within the data storage extent using the physical disk access information associated with the data storage extent within the map for the first application I/O operation.

6. The method of claim 5 comprising performing a commit operation to update a state of the physical disk access information associated with the created data storage extent at the server to valid.

7. The method of claim 5 comprising performing a commit operation to update a state of the physical disk access information associated with the created data storage extent within the map for the first application I/O operation to valid.

8. The method of claim 7 comprising creating a read data access map and storing the physical disk access information associated with the created data storage extent within the read data access map and setting a state of the physical disk access information to valid.

9. The method of claim 7 comprising creating a read/write data access map and storing the physical disk access information associated with the created data storage extent within the read/write data access map and setting a state of the physical disk access information to valid.

10. The method of claim 9 comprising, in response to a second application I/O operation, wherein the second application I/O operation includes a read request, reading data associated with a region of a virtual address space associated with the read request from the storage extent in the disk array using the physical disk access information.

11. The method of claim 1 wherein the first application I/O operation includes a read request and wherein the read request is performed by reading data from the disk array without intervention by the server and wherein the map for the first application I/O operation includes a read data access map.

12. The method of claim 11 comprising, at the server, creating logical storage extent access information associated with a region of a virtual address space associated with the read request in the map for the first application I/O operation and setting a state of the logical storage extent access information associated with the region of the virtual address space associated with the read request within the map to none.

13. The method of claim 11 comprising, at the client node, creating logical storage extent access information associated with a region of a virtual address space associated with the read request in the map for the first application I/O operation and setting a state of the logical storage extent access information associated with the region of the virtual address space associated with the read request within the map to none.

14. The method of claim 1 wherein the first application I/O operation includes a read request and wherein the read request is performed by returning a zero-filled buffer in response to detecting that sufficient space in the disk array has not been mapped at the node for the first application I/O operation.

15. A system for providing access to shared storage by a plurality of nodes, the system comprising:
(a) a disk array;
(b) a data storage extent pool representing at least a portion of the disk array and including at least one data storage block;
(c) a server for tracking and providing physical disk access information associated with the at least one data storage block of the data storage extent pool to a plurality of client nodes sharing access to the disk array, the physical disk access information maintained within a file system with logical units (LUNS) associated with the disk array mapped to files; and
(d) a plurality of client nodes separate from and sharing access to the disk array, wherein the plurality of client nodes includes a first client node adapted to, in response to a first application input/output (I/O) operation:
  (i) detect whether sufficient space in the disk array has been mapped at the node for the first application I/O operation;
  (ii) in response to detecting that sufficient space in the disk array has not been mapped at the first client node for the first application I/O operation, request, from the server, and obtain, from the server, a map including physical disk access information for the first application I/O operation, wherein the physical disk access information includes a physical address of a location within a disk of the disk array; and
  (iii) use the map for the first application I/O operation obtained from the server to perform the first application I/O operation by accessing the disk array using the physical disk access information without intervention by the server, wherein the first client node maintains the map and uses the map for subsequent application I/O operations including accessing physical disks of the disk array directly without interaction with the server.

16. The system of claim 15 wherein the first application I/O operation includes a write request and wherein the first client node is adapted to perform the write request by writing data to the disk array using the physical disk access information without intervention by the server and wherein the map for the first application I/O operation obtained from the server includes a write data access map.

17. The system of claim 16 wherein the server is adapted to allocate at least one data storage block in the disk array to create a data storage extent for a region of a virtual address space associated with the write request.

18. The system of claim 17 wherein the server is adapted to create the physical disk access information and logical storage extent access information associated with the created data storage extent at a logical location for the region of the virtual address space associated with the write request and to mark a state of the physical disk access information as invalid within the map for the first application I/O operation.

19. The system of claim 18 wherein the first client node is adapted to access the disk array without intervention by the server to perform the write request by storing data associated with the write request within the data storage extent using the physical disk access information associated with the data storage extent within the map for the first application I/O operation.

20. The system of claim 19 wherein the node is adapted to perform a commit operation to update a state of the physical disk access information associated with the created data storage extent at the server to valid.

21. The system of claim 19 wherein the first client node is adapted to perform a commit operation to update a state of the physical disk access information associated with the created data storage extent within the map for the first application I/O operation to valid.

22. The system of claim 21 wherein the first application I/O operation includes a read request and wherein the server is adapted to store the physical disk access information associated with the created data storage extent and to set a state of the physical disk access information to valid within the map for the first application I/O operation.

23. The system of claim 21 wherein the first application I/O operation includes a write request and wherein the server is adapted to store the physical disk access information associated with the created data storage extent and to set a state of the physical disk access information to valid within the map for the first application I/O operation.

24. The system of claim 23 wherein the node is adapted to, in response to a second application I/O operation, wherein the second application I/O operation includes a read request, read data associated with a region of a virtual address space associated with the read request from the storage extent in the disk array using the physical disk access information.

25. The system of claim 15 wherein the first application I/O operation includes a read request and wherein the first client node is adapted to perform the read request by reading data from the disk array using the physical disk access information without interaction by the server and wherein the map for the first application I/O operation includes a read data access map.

26. The system of claim 25 wherein the server is adapted to create logical storage extent access information associated with a region of a virtual address space associated with the read request in the read data access map and to set a state of the logical storage extent access information associated with the region of the virtual address space associated with the read request within the map to none.

27. The system of claim 25 the first client node is adapted to create logical storage extent access information associated with a region of a virtual address space associated with the read request in the read data access map and to set a state of the logical storage extent access information associated with the region of the virtual address space associated with the read request within the map to none.

28. The system of claim 15 wherein the first application I/O operation includes a read request and wherein the node is adapted to perform the read request by returning a zero-filled buffer in response to detecting that sufficient space in the disk array has not been mapped at the node for the first application I/O operation.

29. A system for providing access to shared storage and shared services in a redundant array of inexpensive disks (RAID) environment by computing grids and clusters with large numbers of nodes, the system comprising:
   (a) a disk array;
   (b) a data storage extent pool representing at least a portion of the disk array and including at least one data storage block;
   (c) a plurality of client nodes separate from and sharing access to the disk array, the plurality of client nodes including a first client node adapted to, in response to an application input/output (I/O) operation:
      (i) detect whether sufficient space in the disk array has been mapped at the node for the application I/O operation;
      (ii) in response to detecting that sufficient space in the disk array has not been mapped at the first client node for the application I/O operation, request, from a server, and obtain, from the server, a map for the application I/O operation, wherein the physical disk access information includes a physical address of a location within a disk of the disk array; and
      (iii) use the map for the application I/O operation obtained from the server to perform the application I/O operation by accessing the disk array without intervention by the server, wherein the first client node maintains the map and uses the map for subsequent application I/O operations including accessing physical disks of the disk array directly without interaction with the server.

30. A client node for accessing shared storage in a disk array using information provided by a server, the client node comprising:
   (a) an application for performing an input/output (I/O) operation;
   (b) an extent map cache for storing mappings between logical identifiers and physical storage blocks within a disk array, wherein the mappings include a physical address of a location within a disk of the disk array;
   (c) a fragment mapping protocol client for, in response to the I/O operation and a determination that a mapping does not exist for the I/O operation in the extent map cache, requesting, from a server, and obtaining, from the server, a mapping for the I/O operation;
   (d) a fragment mapping protocol pseudo-device for obtaining a physical disk identifier for the I/O operation from the extent map cache; and
   (e) a disk interface for performing the I/O operation using the physical disk identifier, wherein the client node maintains the mapping and uses the mapping for subsequent I/O operations including accessing physical disks of the disk array directly without interaction with the server and wherein the client node is separate from the disk array.

31. A computer program product comprising computer-executable instructions embodied in a computer-readable medium for performing steps comprising:
   at a client node of a plurality of client nodes separate from and sharing access to a disk array:
   (a) detecting an application input/output (I/O) operation;
   (b) detecting whether sufficient space in the disk array has been mapped at the client node for the application I/O operation;
   (c) in response to detecting that sufficient space in the disk array has not been mapped at the client node for the application I/O operation, requesting, from a server, and obtaining, from the server, a map for the application I/O operation, wherein the physical disk access information includes a physical address of a location within a disk of the disk array; and
   (d) using the map for the I/O operation obtained from the server to perform the I/O operation by accessing the disk array without intervention by the server, wherein the client node maintains the map and uses the map subsequent application I/O operations including accessing physical disks of the disk array directly without interaction with the server.

* * * * *